United States Patent
Mori et al.

(10) Patent No.: US 10,417,993 B2
(45) Date of Patent: Sep. 17, 2019

(54) DISPLAY CONTROL DEVICE AND INFORMATION DISPLAY DEVICE

(71) Applicant: MITSUBISHI ELECTRIC CORPORATION, Tokyo (JP)

(72) Inventors: Yoshihiko Mori, Tokyo (JP); Takehisa Mizuguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/518,462

(22) PCT Filed: Nov. 12, 2014

(86) PCT No.: PCT/JP2014/079954
§ 371 (c)(1),
(2) Date: Apr. 11, 2017

(87) PCT Pub. No.: WO2016/075774
PCT Pub. Date: May 19, 2016

(65) Prior Publication Data
US 2017/0309248 A1     Oct. 26, 2017

(51) Int. Cl.
*G09G 5/02* (2006.01)
*B60K 35/00* (2006.01)
(Continued)

(52) U.S. Cl.
CPC ............... *G09G 5/02* (2013.01); *B60K 35/00* (2013.01); *B62D 15/0295* (2013.01);
(Continued)

(58) Field of Classification Search
CPC . G09G 5/02; G09G 5/36; G06F 3/048; B62D 15/0295; B60K 2350/92
See application file for complete search history.

(56) References Cited

U.S. PATENT DOCUMENTS

2006/0284839 A1\* 12/2006 Breed .................. B60W 50/16
                                                                        345/156
2007/0057781 A1\* 3/2007 Breed .................. B60K 35/00
                                                                        340/457.1
(Continued)

FOREIGN PATENT DOCUMENTS

CN      103832330 A  *  6/2014
JP      62-58112 A      3/1987
(Continued)

OTHER PUBLICATIONS

Office Action dated Aug. 30, 2018 in corresponding Chinese Application No. 201480083461.8.
(Continued)

*Primary Examiner* — Behrang Badii
*Assistant Examiner* — Daniel L Greene
(74) *Attorney, Agent, or Firm* — Birch, Stewart, Kolasch & Birch, LLP

(57) ABSTRACT

A display control device and an information display device will be provided which help, when a vehicle's abnormality is detected, the driver readily recognize the image corresponding to the vehicle's abnormal information item and accurately understand the content of the abnormality. A display control device 1 according to the present invention, which is to be mounted on a vehicle to control display of a display unit 6, includes a communication unit 3 to acquire multiple vehicle information items, a detection unit 4 to detect an abnormality of the vehicle from at least one of the multiple vehicle information items acquired by the communication unit 3, and a display control unit 5 to display on the display unit 6, multiple images each corresponding to one of the multiple vehicle information items, wherein, when an abnormality of the vehicle is detected by the detection unit 4, the display control unit 5 magnifies, from among the multiple images, an image corresponding to the at least one
(Continued)

of the multiple vehicle information items from which the abnormality is detected, to be displayed on the display unit 6.

7 Claims, 22 Drawing Sheets

(51) Int. Cl.
*G06F 3/048* (2013.01)
*G09G 5/36* (2006.01)
*B62D 15/02* (2006.01)
*G06F 3/147* (2006.01)

(52) U.S. Cl.
CPC .............. *G06F 3/048* (2013.01); *G06F 3/147* (2013.01); *B60K 2350/1004* (2013.01); *B60K 2350/1096* (2013.01); *B60K 2350/92* (2013.01); *B60K 2350/965* (2013.01); *B60K 2370/70* (2019.05); *G09G 5/36* (2013.01)

(56) References Cited

U.S. PATENT DOCUMENTS

| | | | | |
|---|---|---|---|---|
| 2007/0128899 | A1* | 6/2007 | Mayer | G06F 9/4406 439/152 |
| 2008/0036790 | A1 | 2/2008 | Ishiyama | |
| 2013/0147793 | A1* | 6/2013 | Jeon | G06F 3/011 345/419 |
| 2014/0309806 | A1* | 10/2014 | Ricci | B60Q 1/00 701/1 |

FOREIGN PATENT DOCUMENTS

| | | | |
|---|---|---|---|
| JP | 2000-116955 | A | 4/2000 |
| JP | 2002-261918 | A | 9/2002 |
| JP | 2004-282465 | A | 10/2004 |
| JP | 2004-352151 | A | 12/2004 |
| JP | 2007-221200 | A | 8/2007 |
| JP | 2009-040281 | A | 2/2009 |
| JP | 2010-277015 | A | 12/2010 |
| JP | 2011-245900 | A | 12/2011 |
| JP | 2012-127850 | A | 7/2012 |
| WO | WO 2005/124735 | A1 | 12/2005 |

OTHER PUBLICATIONS

Office Action dated May 15, 2019 in corresponding Chinese Patent Application No. 201480083461.8.

* cited by examiner

DISPLAY CONTROL DEVICE AND INFORMATION DISPLAY DEVICE

TECHNICAL FIELD

The present invention relates to a display control device that is to be mounted on a vehicle to control display on a display unit, and relates to an information display device that is to be mounted thereon.

BACKGROUND ART

Among traditional information display devices, there is disclosed a display equipped with multiple state-indication lamps which indicate various states of a vehicle to be checked for driving and operating the vehicle. (For example, refer to Patent Document 1) On the other hand, there is disclosed a display which, in an abnormal state, interrupts a predetermined display operation to insert and display, in a display area, a warning symbol indicating the content of the abnormal state. (For example, refer to Patent Document 2)

PRIOR ART DOCUMENT

Patent Document

Patent Document 1: Japanese Patent Laid-Open Publication No. 2004-352151 (Paragraph 0009, FIG. 1)
Patent Document 2: Japanese Patent Laid-Open Publication No. 62-58112 (FIG. 1, FIG. 5)

SUMMARY OF THE INVENTION

Problems to be Solved by the Invention

In such information display devices, as vehicles become multi-functionalized, a number of images indicating vehicle information are to be displayed in a limited display area. As the result, each image is inevitably reduced in size, and when a vehicle's abnormality is detected, the user has a challenge to recognize the image corresponding to the vehicle's abnormal information.

The present invention is made to solve the problem described above and to provide a display control device and an information display device that, in a case when vehicle's abnormality is detected, help the user readily recognize the image corresponding to the vehicle's abnormal information, and accurately understand the content of the abnormality.

Means for Solving the Problem

A display control device according to the present invention, which is to be mounted on a vehicle to control display of a display unit, includes a communication unit to acquire multiple vehicle information items, a detection unit to detect an abnormality of the vehicle from at least one of the multiple vehicle information items acquired by the communication unit, and a display control unit to display on the display unit, multiple images each corresponding to one of the multiple vehicle information items, wherein, when an abnormality of the vehicle is detected by the detection unit, the display control unit magnifies, from among the multiple images, an image corresponding to the at least one of the multiple vehicle information items from which the abnormality is detected, to be displayed on the display unit.

An information display device according to the present invention, which is to be mounted on a vehicle, includes a communication unit to acquire multiple vehicle information items, a detection unit to detect an abnormality of the vehicle from at least one of the multiple vehicle information items acquired by the communication unit, a display unit on which multiple images each corresponding to one of the multiple vehicle information items acquired by the communication unit are displayed and a display control unit to magnify, when an abnormality of the vehicle is detected by the detection unit, an image corresponding to the at least one of the multiple vehicle information items from which the abnormality is detected, from among the multiple images displayed on the display unit, and make the display unit display the magnified image.

Effects of the Invention

According to the description about a display control device and an information display device disclosed in the present invention, the display control device and the information display device can be obtained in which, upon detection of vehicle's abnormality, the image corresponding to the vehicle's abnormal information is magnified and displayed, so that the user can readily recognize the image and accurately understand the content of the abnormality.

EMBODIMENTS FOR CARRYING OUT THE INVENTION

Embodiment 1

With reference to FIGS. 1 through 5, a display control device 1 and an information display device 2 according to Embodiment 1 of the present invention will be explained. Note that in each figure, the elements denoted by the same symbols represent the same or the equivalent elements. This is applied to the entire specification.

Figure 1:
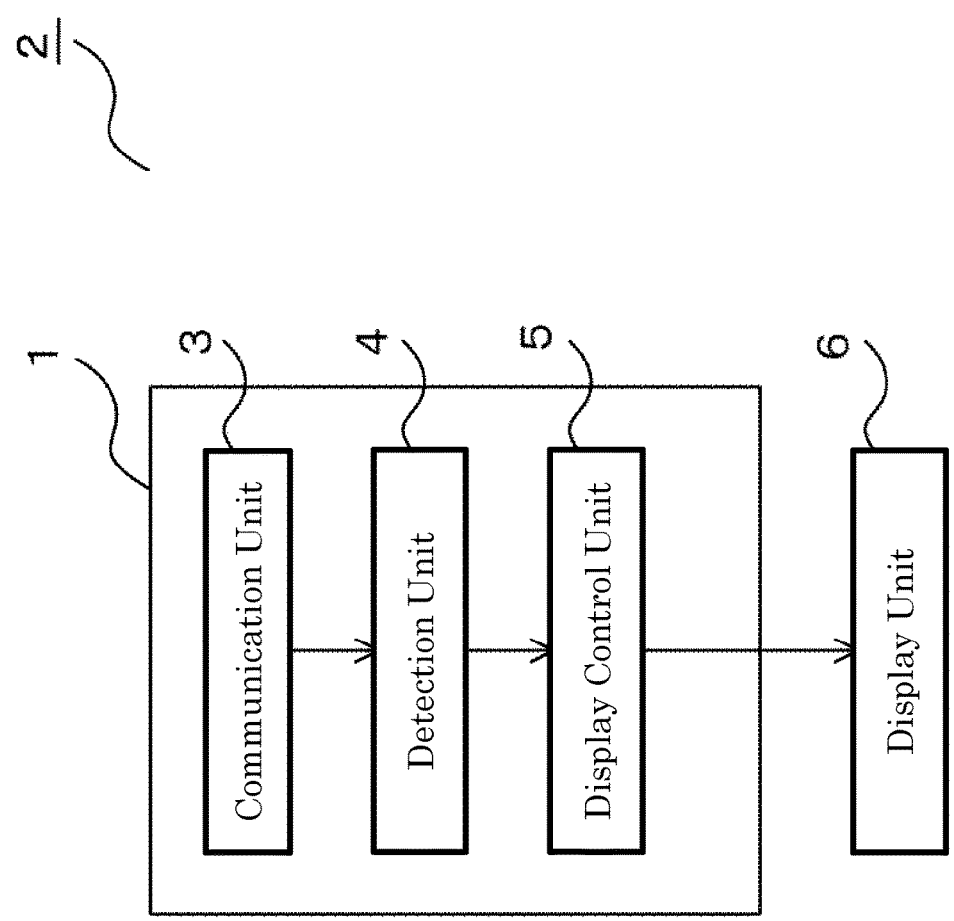
FIG. 1 is a block diagram of an information display device according to Embodiment 1 of the present invention.

FIG. 1 is a block diagram of an information display device 2 according to Embodiment 1 of the present invention. As shown in FIG. 1, the information display device 2 according to Embodiment 1 of the present invention is to be mounted on a vehicle, and displays images each corresponding mainly to one of the vehicle information items on a display unit 6 of the information display device 2. Also, the information display device 2 includes the display unit 6 and the display control device 1 which controls display on the display unit 6. The display control device 1 includes a communication unit 3, a detection unit 4 and a display control unit 5.

The communication unit 3 acquires multiple vehicle information items from a group of ECUs (Electronic Control Units) of the vehicle via, for example, CAN (Controller Area Network) bus. Examples of the multiple vehicle information items are indicator information, headlight information, air pressure information, gasoline information, handbrake information, windshield condensation information, lamp information, ABS information, airbag information, ECO mode information, mileage information, engine information, gear shift information, vehicle speed information, cooling water information, battery information, and power consumption information.

The detection unit 4 detects an abnormality of the vehicle from at least one of the multiple vehicle information items acquired by the communication unit 3. An abnormality of the vehicle is detected, for example, by determining whether the value acquired from the vehicle information item exceeds a predetermined threshold, or whether the response from ECU is not acquired for a predetermined period. The multiple vehicle information items to be acquired by the communication unit 3 may include information about the presence or absence of abnormality. In this case, the detection unit 4 detects an abnormality of the vehicle with reference to the information on the existence of abnormality.

Figure 2:
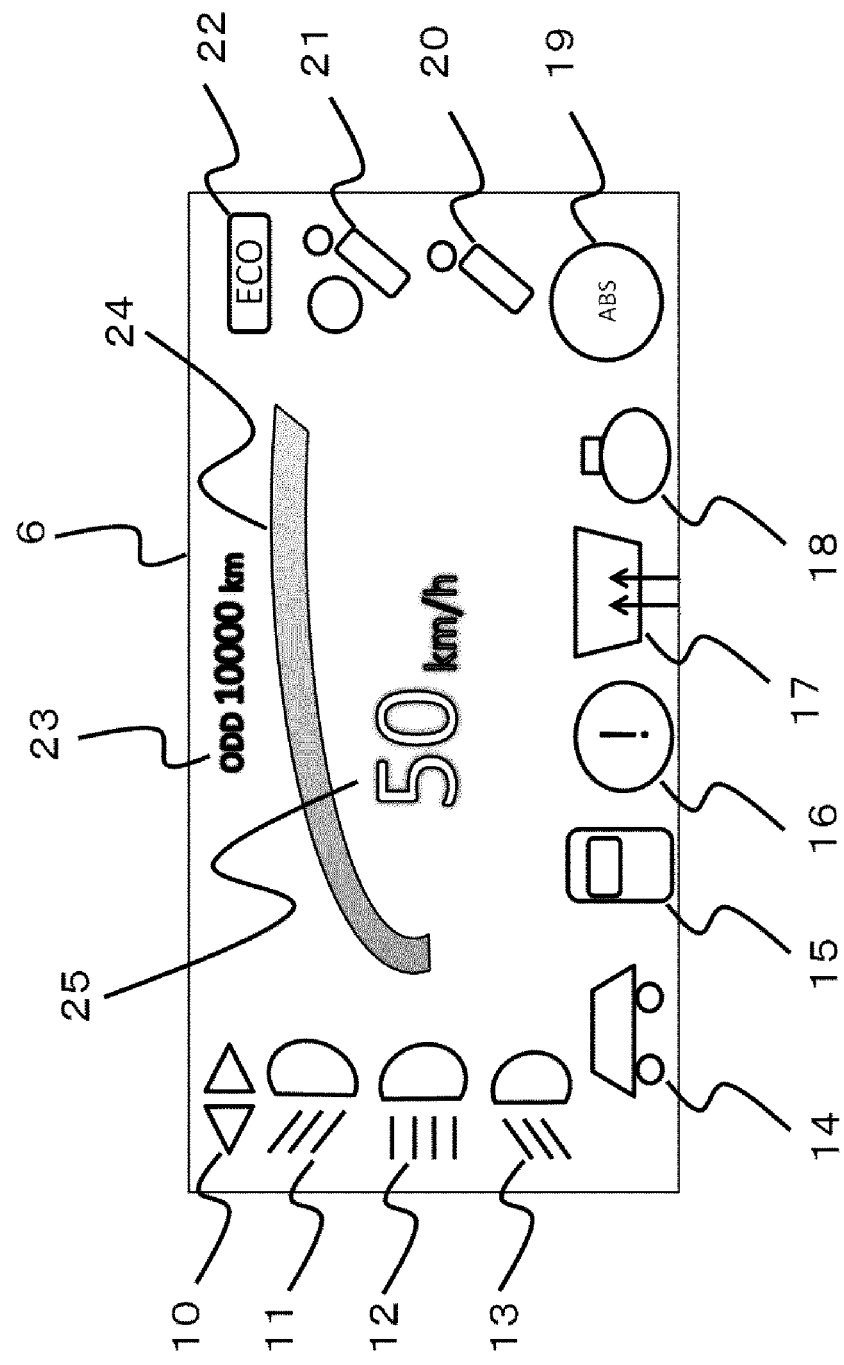
FIG. 2 is a screen image of a display unit of the information display device according to Embodiment 1 of the present invention.

The display unit 6 displays the multiple images each corresponding to one of the multiple vehicle information items acquired by the communication unit 3. As vehicle's functions become more sophisticated, a number of vehicle information images including warning images tend to be displayed on the display unit 6. FIG. 2 shows a screen image of the display unit 6 of the information display device 2 according to Embodiment 1 of the present invention in a normal state. Multiple images shown on the display unit 6 are display examples of the images each corresponding to one of the multiple vehicle information items on the display unit 6. The images includes an indicator image 10, a headlight range control image 11, a high beam image 12, a low beam image 13, an air pressure warning image 14, a gasoline warning image 15, a handbrake warning image 16, a windshield condensation prevention image 17, a lamp warning image 18, an ABS operation image 19, an airbag inactive image 20, an airbag warning image 21, an ECO mode operation image 22, an odometer image 23 indicating mileage, an engine revolution image 24, and a vehicle speed display image 25. From FIG. 2, it will be understood that each image has to be reduced in size because many images are displayed on the display unit 6.

The display control unit 5 displays, on the display unit 6, the multiple images each corresponding to one of the multiple vehicle information items. When the detection unit 4 detects an abnormality of the vehicle, the display control unit 5 magnifies and displays, on the display unit 6, the image corresponding to the vehicle information item from which the abnormality is detected, from among those multiple images. Note that the multiple images displayed on the display unit 6 are normally displayed even in a state where no abnormality is detected. To be more specific, the image corresponding to the vehicle information item from which an abnormality was detected has already been displayed on the display unit 6 from before the abnormality was detected, and has already been in a state in which the user can recognize the image from before abnormality was detected.

Figure 3:
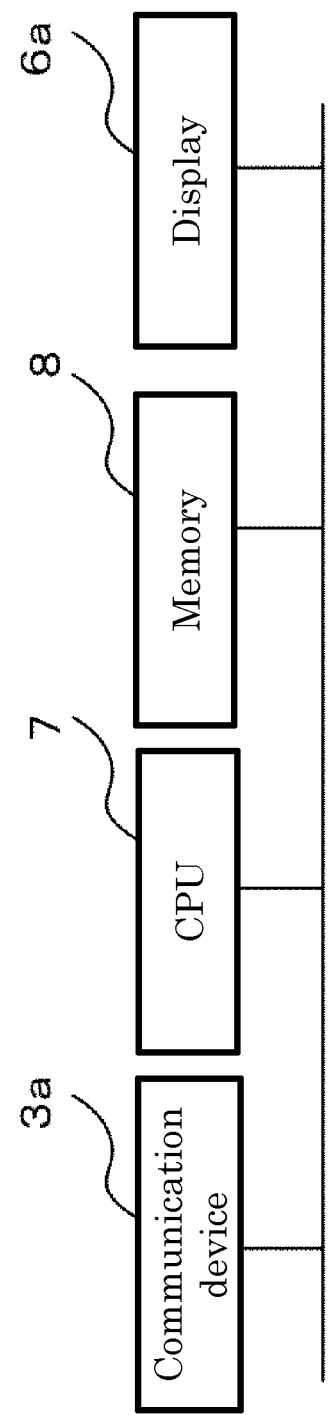
FIG. 3 is a hardware configuration diagram of the information display device according to Embodiment 1 of the present invention.

FIG. 3 is a hardware configuration diagram of the information display device 2 according to Embodiment 1 of the present invention. As shown in FIG. 3, the information display device 2 includes a communication device 3a, a CPU (Control Processing Unit) 7, a memory 8, and a display 6a. The communication unit 3 is the communication device 3a; the detection unit 4 and the display control unit 5 are operated by the CPU 7 executing a program stored in the memory 8. The display unit 6 is a liquid crystal display, or a HUD (head up display) functioning with a windshield, etc. Note that GPU (Graphics Processing Unit) may be used to operate the display control unit 5.

The multiple images to be displayed on the display unit 6 in FIG. 2 are stored in the memory 8, and the display control unit 5 can use the multiple stored images by referring to the memory 8 when needed. The display control unit 5 may magnify the image corresponding to the vehicle information item from which an abnormality is detected, and then display the magnified image on the display unit 6. Alternatively, it is also possible to store in the memory 8, in advance, magnified images of the multiple images which are displayed on the display unit 6, and display the magnified and stored images on the display unit 6 when needed.

Moreover, rotated images, extended images, shrunk images or so forth of the multiple images displayed on the display unit 6 may be stored in the memory 8 in advance. Also, the screen image of the display unit 6 shown in FIG. 2 may be stored in the memory 8 as a normal screen configuration. The position, size and other information of each of the multiple images displayed on the display unit 6 are to be stored in the memory 8 in advance. In addition to the memory 8, another storage device such as a hard disk may be provided to store the multiple images.

Figure 4:
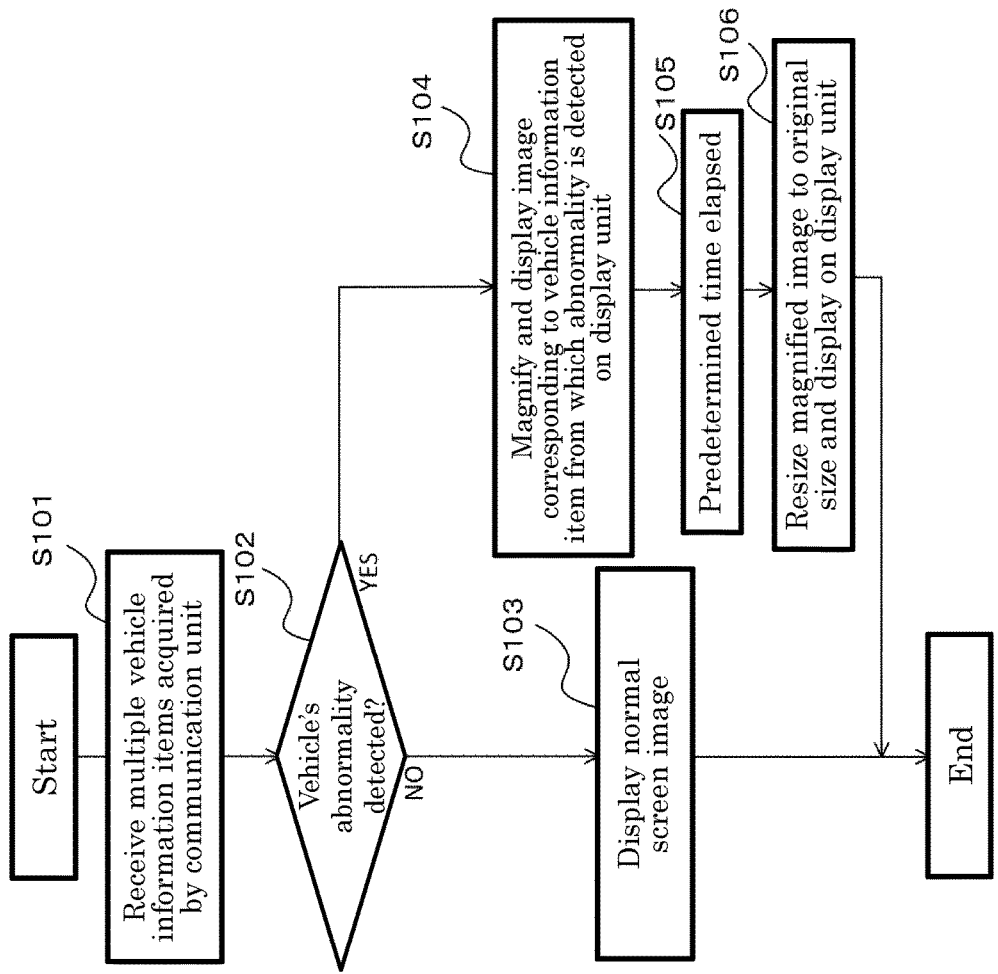
FIG. 4 is a flowchart illustrating the operation of a detection unit and a display control unit according to Embodiment 1 of the present invention.

Next, the operation of the display control device 1 and the information display device 2 in Embodiment 1 of the present invention will be explained with reference to FIG. 4. FIG. 4 is a flowchart illustrating the operation of the detection unit 4 and the display control unit 5 according to Embodiment 1 of the present invention.

In Step S101 of FIG. 4, the detection unit 4 receives the multiple vehicle information items acquired by the communication unit 3. In Step S102, an abnormality of the vehicle is detected on the basis of the multiple vehicle information items received by the detection unit 4. In a case when the detection unit 4 does not detect any abnormality of the vehicle, the process proceeds to Step S103. In Step S103, because the detection unit 4 does not detect any abnormality of the vehicle, the display control unit 5 refers to the memory 8 and displays, on the display unit 6, the screen image for a normal state shown in FIG. 2. Then, the processing of operation ends. On the other hand, when the detection unit 4 detects an abnormality of the vehicle, the process proceeds to Step S104. In Step S104, the display control unit 5 magnifies the image corresponding to the vehicle information item from which the abnormality is detected to display the image on the display unit 6. After the display control unit 5 magnifies and displays the image on the display unit 6, the process proceeds to Step S105, and then proceeds to Step S106 after a predetermined period elapses. In Step S105, the display control unit 5 counts the time during which the magnified image is displayed to determine whether a predetermined period has elapsed. In Step S106, the display control unit 5 resizes the magnified image to the original size (size in a normal state) to display it on the display unit 6.

In a case when, in Step S102, the detection unit 4 does not detect any abnormality of the vehicle, Step S103 may be omitted to end the operation flow. In this case, the screen image already displayed on the display unit 6 is unchanged. Note that in a case when the detection unit 4 detects multiple abnormalities of the vehicle, the display control unit 5 magnifies, in Step S104, multiple images each corresponding to one of the vehicle information items from which abnormalities are detected. When doing so, it is not necessarily needed to magnify and display the multiple images at the same time, but they may be magnified and displayed with some time lags. Further, it has been explained that in Step S105, the process proceeds to Step S106 after a predetermined period has elapsed. But the processing sequence is not limited to this. For example, the process may proceed to Step S106 either when the abnormality in the vehicle information item from which the abnormality was detected has been resolved, or when the user has pressed a switch provided in the vehicle, or an icon or the like displayed on the display unit 6.

In Step S104, the display control unit 5 magnifies, on the basis of at least an image magnification ratio, the image corresponding to the vehicle information item from which an abnormality is detected. The display control unit 5 may use a predetermined magnification ratio, or may determine the magnification ratio such that the magnified image and the images adjacent to the magnified image will not overlap with each other. In Embodiment 1, the magnified image has been magnified so as not to overlap the images adjacent to the magnified image.

Explanation will be made on a regular method with which the display control unit 5 magnifies the image corresponding to the vehicle information item from which an abnormality is detected. The display control unit 5 refers to the memory 8 for the identifier of the image, and refers to at least the image parameter indicating the size of the image. In magnifying an image, the display control unit 5 resizes the image corresponding to the vehicle information item from which an abnormality is detected by changing, according to the magnification ratio, the image parameter indicating the image size. In a case where the image parameters are represented with a matrix, the display control unit 5 conducts calculation using a predetermined matrix for image magnification, and magnifies an image according to the calculated matrix. The image parameters may include position or angle information. The display control unit 5 can change the position and the angle as well as the size of an image by changing the image parameters. In a case where the image parameters are represented with a matrix, the display control unit 5 conducts calculation using a predetermined matrix for changes in size, position and angle of an image, and changes the size, position and angle of an image according to the calculated matrix. Note, however, that the magnification method of an image is not limited to this.

Figure 5:
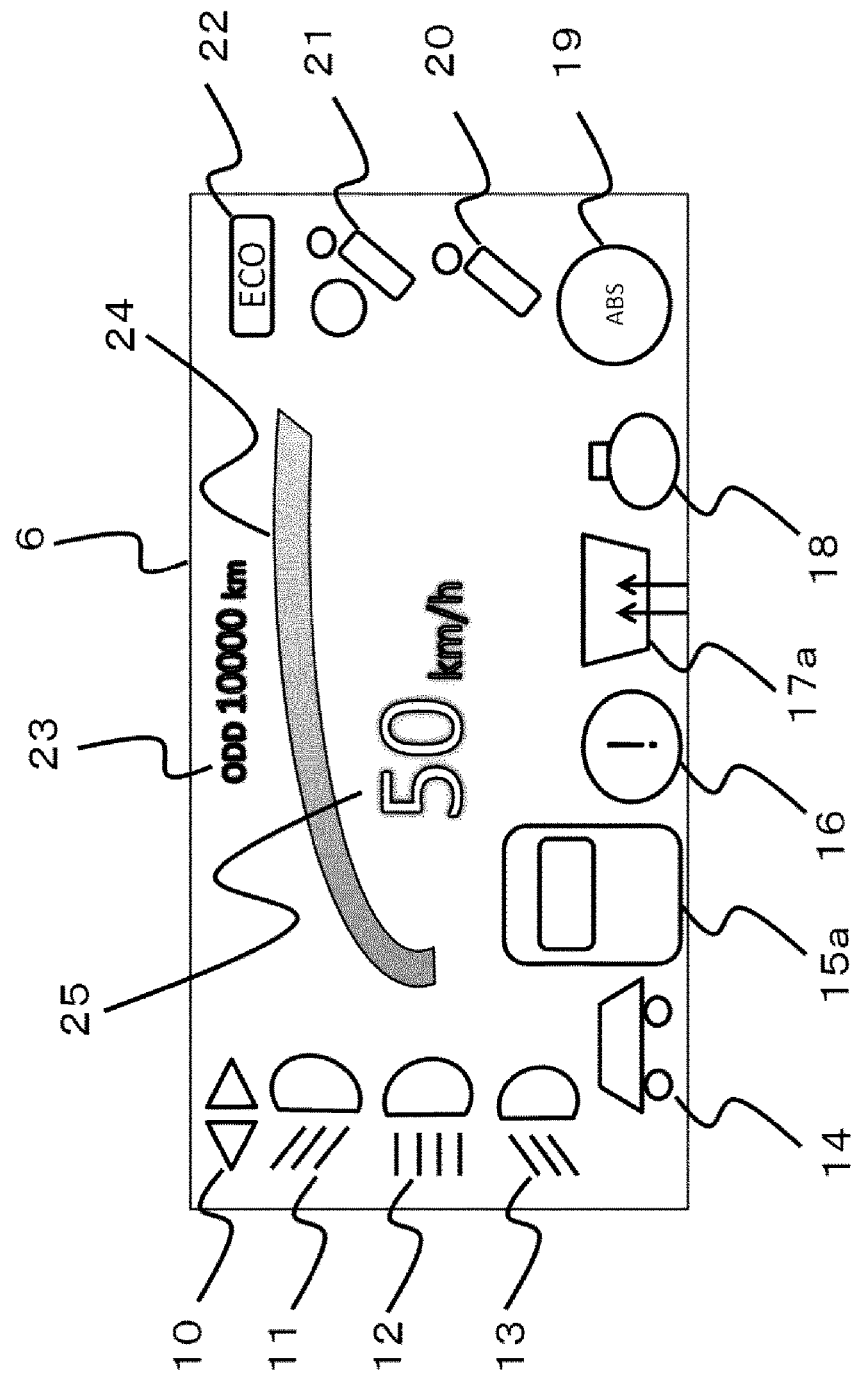
FIG. 5 is a screen image of the display unit of the information display device according to Embodiment 1 of the present invention in an abnormal state.

FIG. 5 shows a screen image of the display unit 6 of the information display device 2 according to Embodiment 1 of the present invention in an abnormal state. In FIG. 5, as an example in a case when an abnormality is detected about the vehicle gasoline, the magnified gasoline warning image 15a is displayed, contrasting with the screen image of the display unit 6 as illustrated in FIG. 2 in a case when no abnormality has been detected. For example, when remaining gasoline of the vehicle falls below a predetermined threshold, the detection unit 4 detects the abnormality of the vehicle, and the display control unit 5 magnifies the gasoline warning image 15 to display it on the display unit 6. When FIG. 2 and FIG. 5 are compared, it is understood that the magnified gasoline warning image 15a is displayed.

As described above, a display control device 1 according to Embodiment 1 of the present invention, which is to be mounted on a vehicle to control display of a display unit 6, includes a communication unit 3 to acquire multiple vehicle information items, a detection unit 4 to detect an abnormality of the vehicle from at least one of the multiple vehicle information items acquired by the communication unit 3, and a display control unit 5 to display on the display unit 6, multiple images each corresponding to one of the multiple vehicle information items, wherein, when an abnormality of the vehicle is detected by the detection unit 4, the display control unit 5 magnifies, from among the multiple images, an image corresponding to the at least one of the multiple vehicle information items from which the abnormality is detected, to be displayed on the display unit 6.

An information display device 2 according to the present invention, which is to be mounted on a vehicle, includes a communication unit 3 to acquire multiple vehicle information items, a detection unit 4 to detect an abnormality of the vehicle from at least one of the multiple vehicle information items acquired by the communication unit 3, a display unit 6 on which multiple images each corresponding to one of the multiple vehicle information items acquired by the communication unit 3 are displayed, and a display control unit 5 to magnify, when an abnormality of the vehicle is detected by the detection unit 4, an image corresponding to the at least one of the multiple vehicle information items from which the abnormality is detected, from among the multiple images displayed on the display unit 6, and make the display unit 6 display the magnified image.

According to this configuration, it is possible to obtain a display control device 1 and an information display device 2 by which, upon detection of vehicle's abnormality, the image corresponding to the vehicle's abnormal information item is magnified and displayed, so that the user can readily recognize the image corresponding to the vehicle's abnormal information item and can accurately understand the content of the abnormality.

Because the multiple images being displayed on the display unit 6 are displayed even in a state when no abnormality is detected about the vehicle, the user can recognize in advance what vehicle information item each of those images indicates. Therefore, it is possible to obtain an effect that the user can readily understand the content of the abnormality of the vehicle if the image corresponding to the vehicle's abnormal information item is magnified and displayed upon the detection of vehicle's abnormality.

Note, however, that the display control unit 5 does not need to display all the time, on the display unit 6, an image which is not to be magnified for display even upon detection of abnormality. Moreover, for the user's easier recognition, on the display unit 6 the display control unit 5 may blink the image to be magnified upon detection of vehicle's abnormality, may display the image with its color changed, may display the image with its luminance changed, or may display the image by a method combined from some or all of these display methods. Furthermore, the images to be magnified by the display control unit 5 upon detection of vehicle' abnormality are not limited to warning images such as the gasoline warning image 15, but may be any image which indicates vehicle information.

Considering the influence that each of vehicle abnormalities gives the vehicle, the magnification ratio for each image to be referred by the display control unit 5 may be determined in advance in accordance with the significance of each vehicle information item. As the result, the display control unit 5 can further magnify the image corresponding to a more significant vehicle information item to improve user's recognition thereof. In addition, the display control unit 5 may display the image corresponding to the vehicle's abnormal information item so as to periodically repeat magnifying and shrinking the image. This can further attract the user's attention.

It is preferable that the image magnification ratios are in the range of two to five times. The image magnification ratio less than two times sometimes may not be big enough to attract the user's attention. On the other hand, the image magnification ratio over five times is too large, sometimes distracting the user's attention. Note, however, that the magnification ratio is not limited to the range of two to five times.

Embodiment 2

Figure 6:
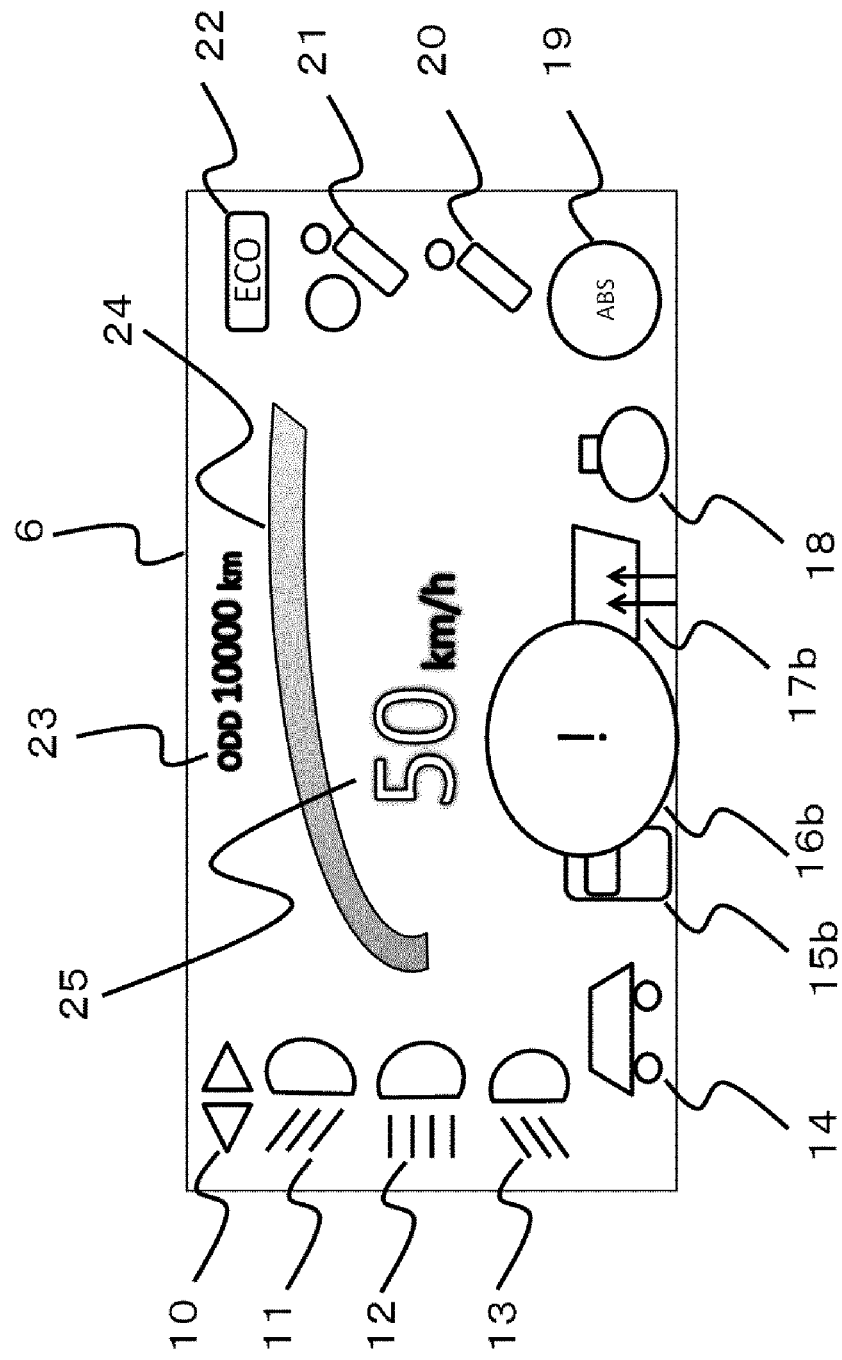
FIG. 6 is a screen image of a display unit of an information display device according to Embodiment 2 of the present invention in an abnormal state.
Figure 7:
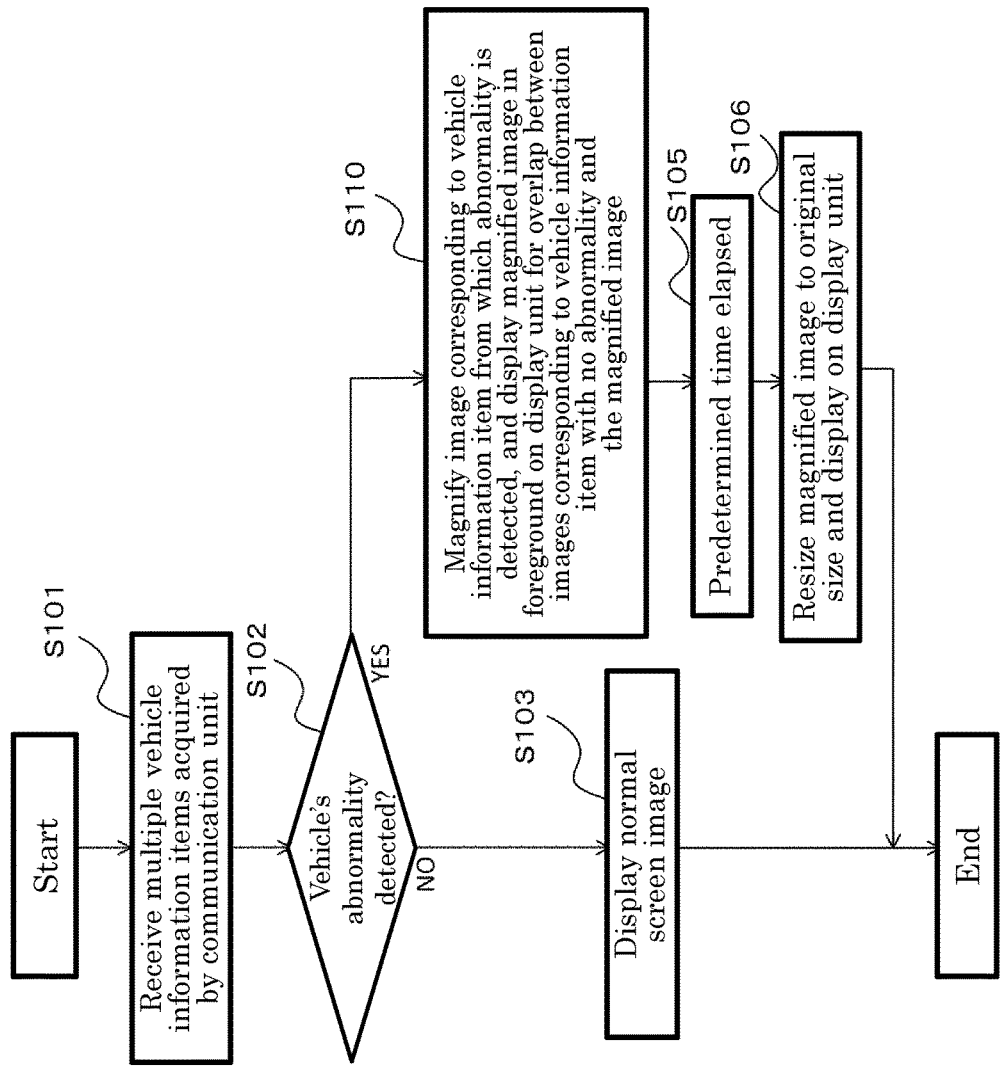
FIG. 7 is a flowchart illustrating the operation of a detection unit and a display control unit according to Embodiment 2 of the present invention.

With reference to FIG. 6 and FIG. 7, a display control device 1 and an information display device 2 according to Embodiment 2 of the present invention will be explained. In the display control device 1 and the information display device 2 according to Embodiment 1 of the present invention, a case has been explained in which the magnified image does not overlap other images. In Embodiment 2 of the present invention, a modified example will be explained in which the magnified image overlaps the adjacent images. Explanation will be made below mainly on the points different from Embodiment 1, and the explanation about the same or corresponding portions will be omitted.

FIG. 6 is a screen image of the display unit 6 of the information display device 2 according to Embodiment 2 of the present invention in an abnormal state. In the foreground on the display unit 6, a display control unit 5 according to Embodiment 2 of the present invention displays a portion of a magnified image corresponding to the vehicle information item from which an abnormality is detected, the portion overlapping an image corresponding to the vehicle information item from which no abnormality is detected. As shown in FIG. 6, a handbrake warning image 16b displayed on the display unit 6 is magnified and overlaps an adjacent gasoline warning image 15b and an adjacent windshield condensation prevention image 17b. In the overlap areas, the handbrake warning image 16b is displayed in the foreground of the screen image, and the gasoline warning image 15b and the windshield condensation prevention image 17b are not displayed there.

Here, the display control unit 5 may adjust the transmittance of the magnified image displayed in the foreground of the screen image to make it translucent such that the overlap portions behind the magnified image will be recognizable. The display control unit 5, as shown in FIG. 6, may make non-transparent the magnified image displayed in the foreground. In such a case, because the images of overlap portions in the background are not displayed in the screen image, the display control unit 5 may discard the data of the overlap portions. For example, it is allowed that firstly referring to a memory 8, the display control unit 5 draws on the screen the gasoline warning image 15b and the windshield condensation prevention image 17b in the background; then, referring to the memory 8 again, the display control unit draws the magnified handbrake warning image 16b over the gasoline warning image 15b as well as the windshield condensation prevention image 17b each of which has an overlap portion with the magnified handbrake warning image 16b, to display, on the display unit 6, the handbrake warning image 16b preferentially to the gasoline warning image 15b and the windshield condensation prevention image 17b. In this case, the display control unit 5 may discard the image data of the overlap portions included in the gasoline warning image 15b and the windshield condensation prevention image 17b. Note, however, that in a case when the magnified handbrake warning image 16b is made translucent, the display control unit 5 needs to hold the image data of the overlap portions of the gasoline warning image 15b and the windshield condensation prevention image 17b.

FIG. 7 is a flowchart illustrating the operation of the detection unit 4 and the display control unit 5 according to Embodiment 2 of the present invention. Steps S101, S102 and S103 are respectively the same as the Steps S101, S102 and S103 illustrated in FIG. 4 of Embodiment 1. In Embodiment 2, when the detection unit 4 detects an abnormality of the vehicle in Step S102, the process proceeds to Step S110. In Step S110, the display control unit 5 magnifies the image corresponding to the vehicle information item from which the abnormality is detected, and displays the magnified image in the foreground on the display unit 6 for the overlaps between the magnified image and the images each of which corresponds, among the multiple images, to one of the vehicle information items with no abnormality. Steps S105 and S106 are respectively the same as Steps S105 and S106 illustrated in FIG. 4 of Embodiment 1.

As described above, according to the display control device 1 and the information display device 2 of Embodiment 2 of the present invention, the display control unit 5 is characterized in that the portions of the magnified image overlapping the images each of which corresponds to one of the vehicle information items from which no abnormality is detected are to be displayed in the foreground.

According to this configuration, in a case when the image corresponding to the vehicle information item from which an abnormality is detected is magnified to overlap the adjacent images, the magnified image will not be missing by the adjacent images because the magnified image is displayed in the foreground. Therefore, the user can accurately recognize the magnified image. In addition, because the magnification ratio for the image corresponding to the vehicle information item from which an abnormality is detected can be set larger than in a case as disclosed in Embodiment 1 where the image corresponding to the vehicle information item from which an abnormality is detected is displayed so as not to overlap the adjacent images, it is possible to obtain an effect that the user can readily recognize the image corresponding to the vehicle information item from which an abnormality is detected, and can accurately understand the content of the vehicle's abnormality than in a case where the image corresponding to the vehicle information item from which an abnormality is detected is displayed so as not to overlap the adjacent images.

When the magnified image and the adjacent images overlap each other, the display control unit 5 may further calculate the area sizes of the overlaps to adjust the magnification ratio so that the overlap area will be equal to or less than a predetermined threshold. This adjustment can prevent the magnified image from making the adjacent images completely invisible or almost invisible. Here, the display control unit 5 can calculate the overlap areas between the magnified image and the adjacent images, for example, by assuming a virtual rectangular area surrounding each image to define the number of pixels included in the overlap portion between the rectangular areas as the area size of the overlap portion.

Embodiment 3

Figure 8:
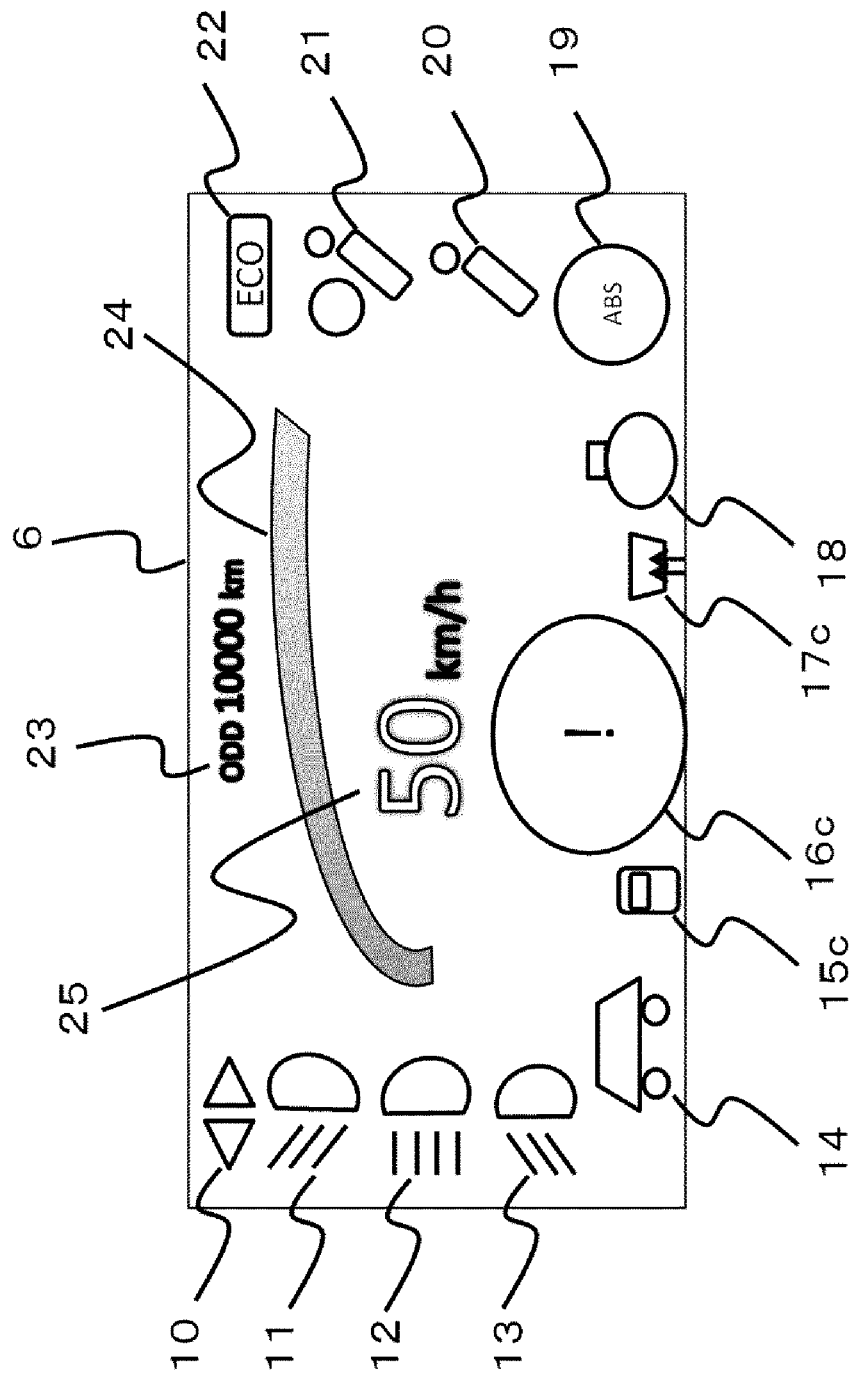
FIG. 8 is a screen image of a display unit of an information display device according to Embodiment 3 of the present invention in an abnormal state.
Figure 9:
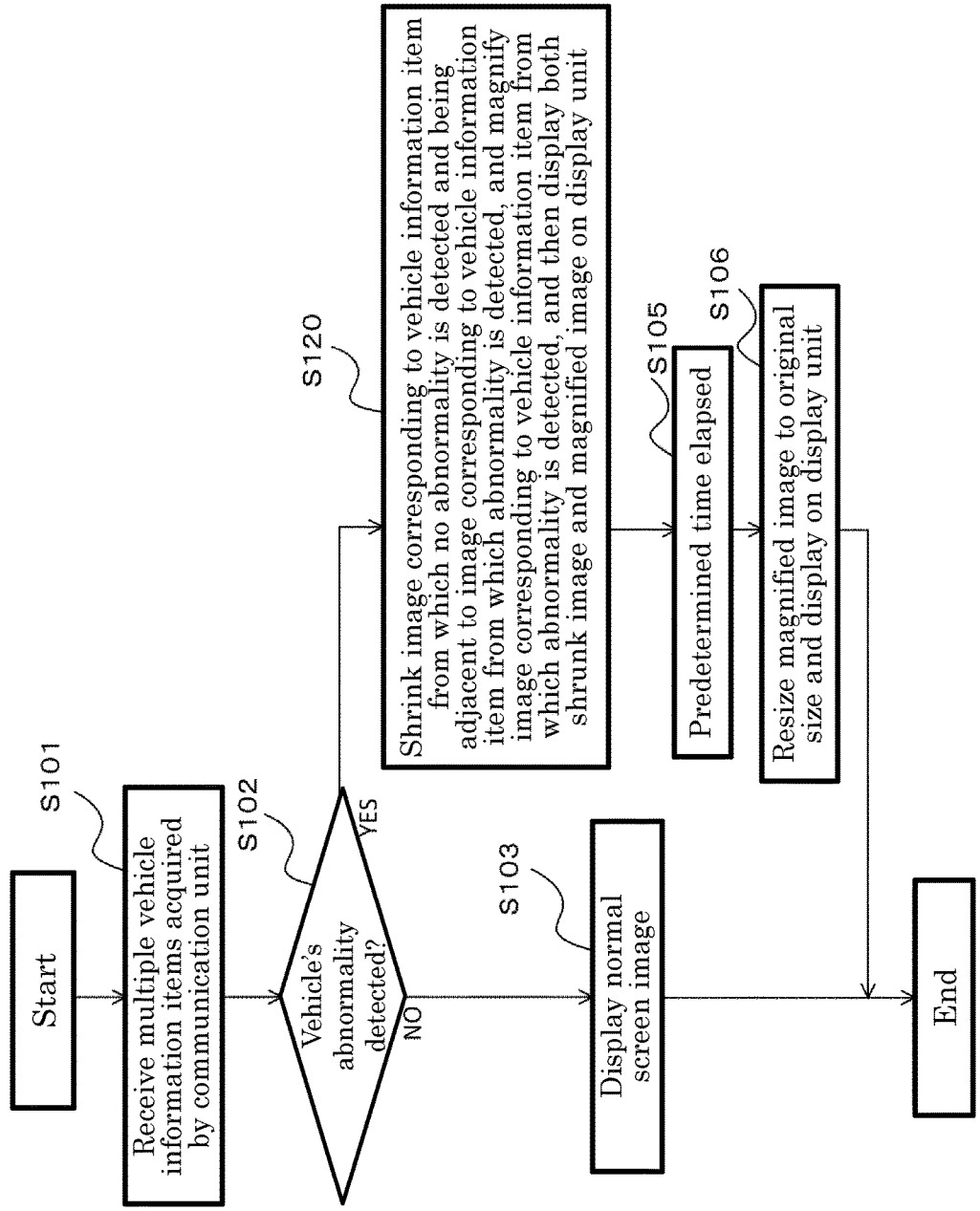
FIG. 9 is a flowchart illustrating the operation of a detection unit and a display control unit according to Embodiment 3 of the present invention.

With reference to FIG. 8 and FIG. 9, a display control device 1 and an information display device 2 according to Embodiment 3 of the present invention will be explained. In Embodiment 3 of the present invention, a modified example will be explained in which an adjacent image to the magnified image is to be shrunk. Explanation will be made below mainly on the points different from Embodiment 1, and the explanation about the same or corresponding portions will be omitted.

FIG. 8 is a screen image of the display unit 6 of the information display device 2 according to Embodiment 3 of the present invention in an abnormal state. A display control unit 5 according to Embodiment 3 of the present invention shrinks and displays, on the display unit 6, the images which are adjacent to the image corresponding to the vehicle information item from which an abnormality is detected, and which also correspond to the vehicle information items from which no abnormality is detected. As shown in FIG. 8, a handbrake warning image 16c displayed on the display unit 6 is magnified, and the adjacent images which are a gasoline warning image 15c and a windshield condensation prevention image 17c are shrunk.

FIG. 9 is a flowchart illustrating the operation of a detection unit 4 and the display control unit 5 according to Embodiment 3 of the present invention. Steps S101, S102 and S103 are respectively the same as Steps S101, S102 and S103 illustrated in FIG. 4 of Embodiment 1. In Embodiment 3, when the detection unit 4 detects an abnormality of the vehicle in Step S102, the process proceeds to Step S120. In Step S120, the display control unit 5 shrinks an image that corresponds to the vehicle information item from which no abnormality is detected, and that also is adjacent to the image corresponding to the vehicle information item from which the abnormality is detected; and the display control unit magnifies the image corresponding to the vehicle information item from which the abnormality is detected, and then displays both the shrunk image and the magnified image on the display unit 6. Steps S105 and S106 are respectively the same as Steps S105 and S106 illustrated in FIG. 4 of Embodiment 1.

As described above, according to the display control device 1 and the information display device 2 of Embodiment 3 of the present invention, the display control unit 5 is characterized in that the unit magnifies and displays, on the display unit 6, the image corresponding to the vehicle information item from which an abnormality is detected, and shrinks and displays, on the display unit 6, the image that is adjacent to the image corresponding to the vehicle information item from which the abnormality is detected, and that also corresponds to the vehicle information item from which no abnormality is detected.

According to this configuration, when the image corresponding to the vehicle information item from which an abnormality is detected is to be magnified and displayed on the display unit 6, because the display control unit 5 shrinks and displays the adjacent images on the display unit 6, the magnification ratio of the image corresponding to the vehicle information item from which the abnormality is detected can be set larger than in a case when the adjacent images are to be displayed with the same size as in a normal state. Therefore, it is possible to obtain an effect that the user can understand the content of the abnormality of the vehicle more easily than when the adjacent images are to be displayed with the same size as in a normal state.

In Embodiment 3 of the present invention, it has been explained that the display control unit 5 first shrinks the image that corresponds to the vehicle information item from which no abnormality is detected, and that is also adjacent to the image corresponding to the vehicle information item from which an abnormality is detected, and then the display control unit magnifies the image corresponding to the vehicle information item from which the abnormality is detected. Note, however, that the order of processing is not limited to this. In Embodiment 3 of the present invention, the display control unit 5 shrinks only the adjacent images to the image corresponding to the vehicle information item from which an abnormality is detected. However, the display control unit 5 may shrink multiple images located in a direction in which each adjacent image to the image corresponding to the vehicle information item from which the abnormality is detected exists. For example, when the handbrake warning image 16 illustrated in FIG. 2 is magnified, the air pressure warning image 14 may be shrunk in addition to the gasoline warning image 15. Similarly, when the handbrake warning image 16 illustrated in FIG. 2 is magnified, the lamp warning image 18 and the ABS operation image 19 may be shrunk in addition to the windshield condensation prevention image 17.

Embodiment 4

A display control device 1 and an information display device 2 according to Embodiment 4 of the present invention will be explained with reference to FIGS. 10 through 12. In Embodiment 4 of the present invention, a modified example will be explained in which images around the magnified image are to be moved in a predetermined direction and further away from the magnified image. Explanation will be made below mainly on the points different from Embodiment 1, and the explanation about the same or corresponding portions will be omitted.

Figure 10:
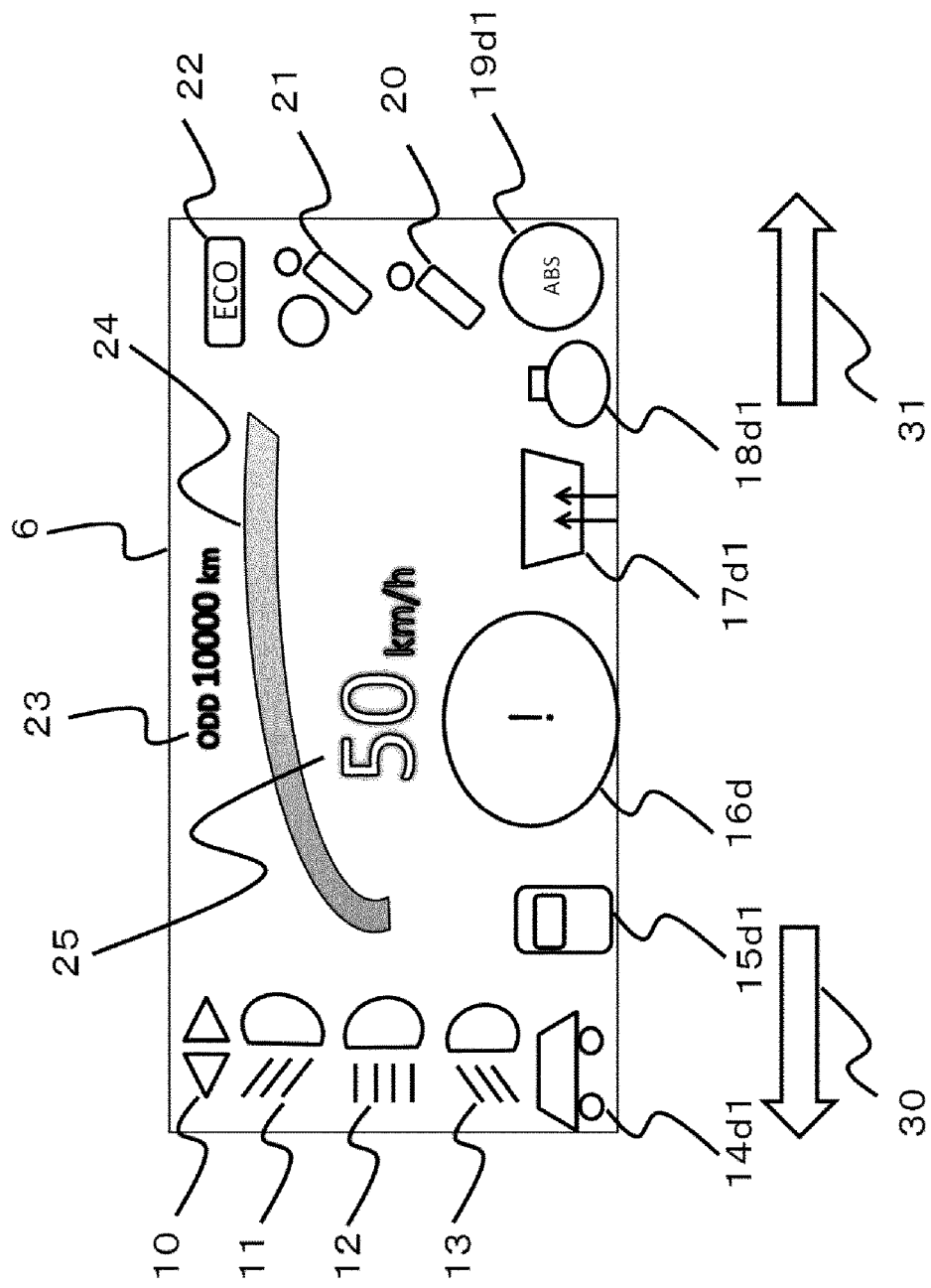
FIG. 10 is a screen image of a display unit of an information display device according to Embodiment 4 of the present invention in an abnormal state.

FIG. 10 is a screen image of the display unit 6 of an information display device 2 according to Embodiment 4 of the present invention in an abnormal state. A display control unit 5 according to Embodiment 4 of the present invention moves the images around the image corresponding to the vehicle information item from which an abnormality is detected, in a predetermined direction and further away from the image corresponding to the vehicle information item from which the abnormality is detected, and displays the moved images on the display unit 6. As shown in FIG. 10, a handbrake warning image 16d displayed on the display unit 6 is magnified, and the surrounding images of the handbrake warning image 16d which are an air pressure warning image 14d1, a gasoline warning image 15d1, a windshield condensation prevention image 17d1, and a lamp warning image 18d1, are moved further away from the handbrake warning image 16d and displayed as such.

In Embodiment 4 of the present invention, on the screen of the display unit 6, the display control unit 5 moves and displays the multiple images, which are located in a first lateral direction 30, a left arrow, against the magnified handbrake warning image 16d further toward the first lateral direction 30; and the unit also moves and displays the multiple images, which are located in a second lateral direction 31, a right arrow, against the magnified handbrake warning image 16d, namely the opposite direction to the first lateral direction 30, further toward the second lateral direction 31. The display control unit 5 moves and displays the air pressure warning image 14d1 and the gasoline warning image 15d1 to the left on the screen in accordance with the first lateral direction 30 illustrated FIG. 10, and moves and displays the gasoline warning image 15d1 and the windshield condensation prevention image 17d1 to the right on the screen in accordance with the second lateral direction 31 illustrated FIG. 10.

The move directions may be predetermined from the position of the magnified image for the display control unit 5. For example, when the display control unit 5 magnifies the high beam image 12 located in the left on the screen, the display control unit 5 moves upward the indicator image 10 and the headlight range control image 11, downward the low beam image 13 and the air pressure warning image 14 such that the moved images are to be displayed on the screen further away from the high beam image 12. Similarly, when the display control unit 5 magnifies the airbag warning image 21 in the right on the screen, the display control unit 5 moves upward the ECO mode operation image 22, downward the airbag inactive image 20 and the ABS operation image 19 such that the moved images are to be displayed on the screen further away from the airbag warning image 21. In summary, the display control unit 5 moves and displays, on the display unit 6, the images around the image corresponding to the vehicle information item from which an abnormality is detected, in predetermined directions and further away from the image corresponding to the vehicle information item from which the abnormality is detected. The display control unit 5 moves the surrounding images in directions further away from the image corresponding to the vehicle information item from which an abnormality is detected. Note, however, that the directions in which the surrounding images are to be moved are not limited to the specific directions.

The display control unit 5 may move, as the surrounding images to be moved in predetermined directions and further away from the image, only the images adjacent to the image corresponding to the vehicle information item from which an abnormality is detected. Instead, the display control unit 5 may move multiple images including the adjacent images. FIG. 11 is another example of a screen image of the display unit of the information display device 2 according to Embodiment 4 of the present invention in an abnormal state. As shown in FIG. 11, the display control unit 5 moves a gasoline warning image 15d2 adjacent to the magnified handbrake warning image 16d in the first lateral direction 30. As the gasoline warning image 15d2 overlaps an air pressure warning image 14d2, the display control unit 5 displays the gasoline warning image 15d in the foreground on the display unit 6. The display control unit 5 also moves a windshield condensation prevention image 17d2 adjacent to the magnified handbrake warning image 16d and a lamp warning image 18d2 in the second lateral direction 31. As the lamp warning image 18d2 overlaps an ABS operation image 19d2, the display control unit 5 displays the lamp warning image 18d2 in the foreground on the display unit 6.

Figure 11:
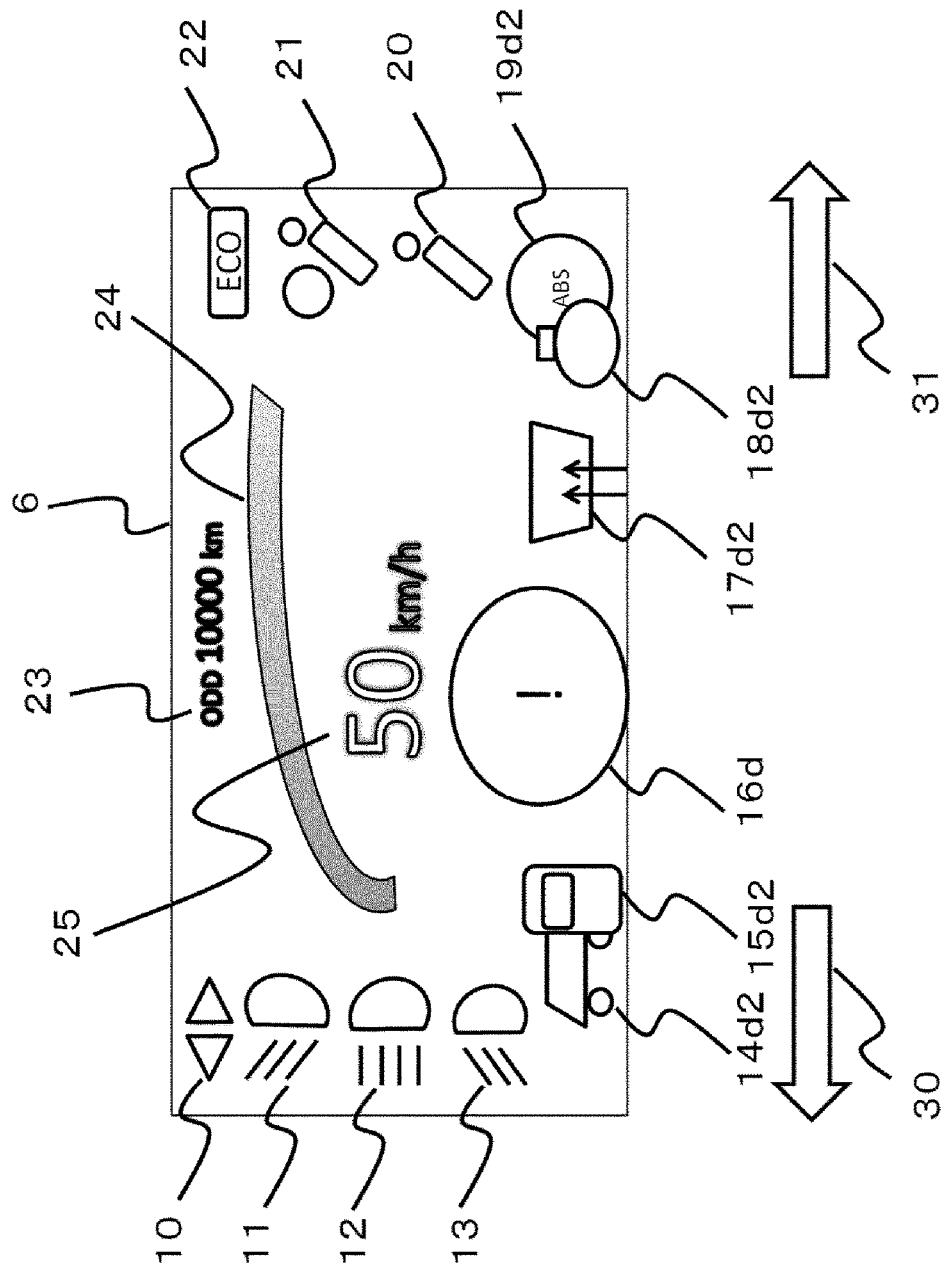
FIG. 11 is another screen image of the display unit of the information display device according to Embodiment 4 of the present invention in an abnormal state.

As shown in FIG. 11, the gasoline warning image 15d2 and the air pressure warning image 14d2 overlap each other, and the lamp warning image 18d2 and the ABS operation image 19d2 overlap each other. For each of the overlap portions, whichever of the overlapping images may be displayed in the foreground on the display unit 6. Further, the display control unit 5 may move the surrounding images so that the images will not overlap each other.

Figure 12:
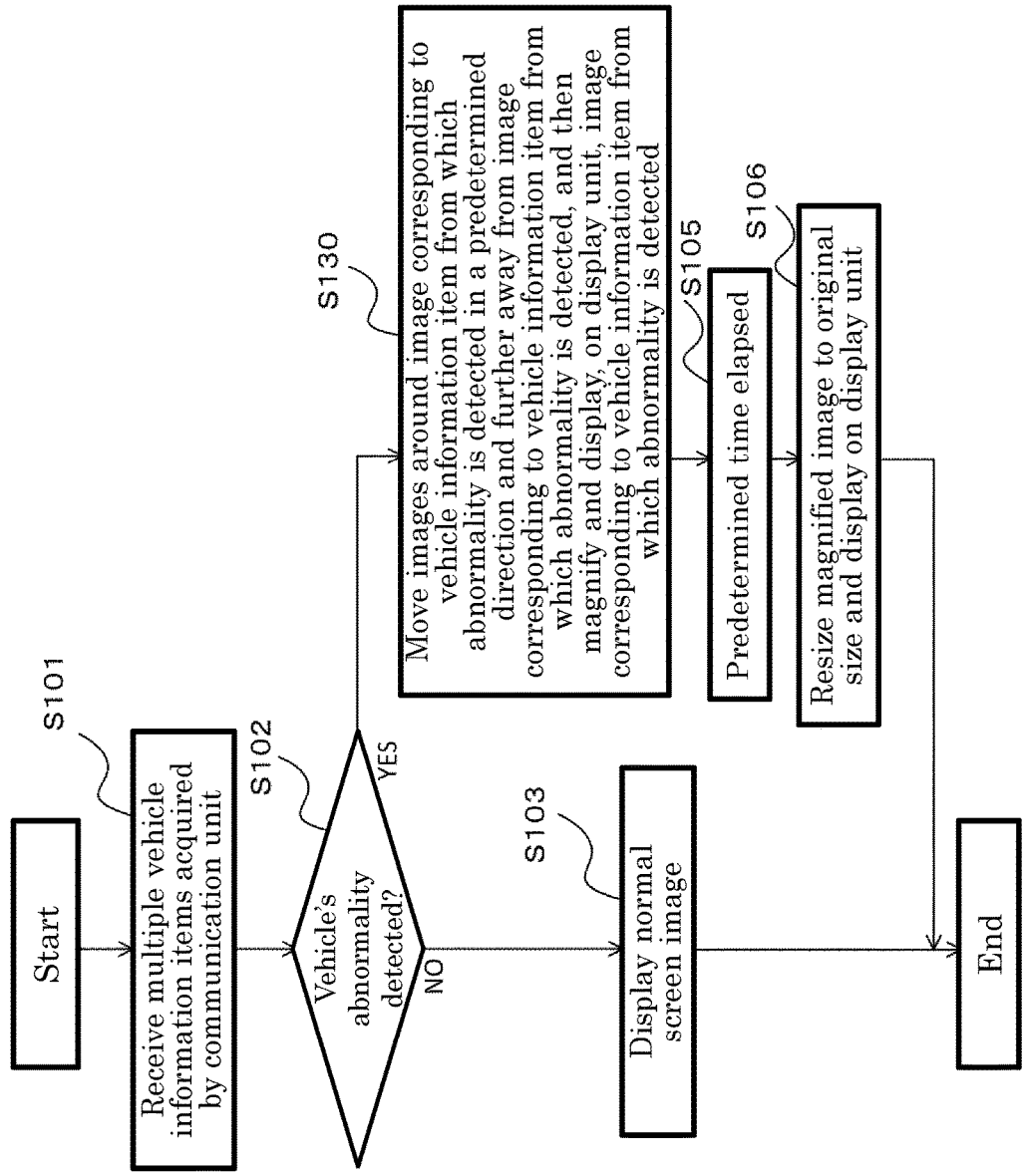
FIG. 12 is a flowchart illustrating the operation of a detection unit and a display control unit according to Embodiment 4 of the present invention.

FIG. 12 is a flowchart illustrating the operation of the detection unit 4 and the display control unit 5 according to Embodiment 4 of the present invention. Steps S101, S102 and S103 are respectively the same as the Steps S101, S102 and S103 illustrated in FIG. 4 of Embodiment 1. In Embodiment 4, when the detection unit 4 detects an abnormality of the vehicle in Step S102, the process proceeds to Step S130. In Step S130, the display control unit 5 moves the images around the image corresponding to the vehicle information item from which the abnormality is detected, in predetermined directions and further away from the image corresponding to the vehicle information item from which the abnormality is detected, and magnifies and displays, on the display unit 6, the image corresponding to the vehicle information item from which the abnormality is detected. Steps S105 and S106 are respectively the same as Steps S105 and S106 illustrated in FIG. 4 of Embodiment 1.

As described above, according to the display control device 1 and the information display device 2 of Embodiment 4 of the present invention, the display control unit 5 is characterized in that the unit moves and displays on display unit 6 the images around the image corresponding to the vehicle information item from which an abnormality is detected in predetermined directions and further away from the image corresponding to the vehicle information item from which the abnormality is detected.

According to this configuration, when the image corresponding to the vehicle information item from which an abnormality is detected is to be magnified, the surrounding images are moved further away from the image corresponding to the vehicle information item from which the abnormality is detected; therefore, the magnification ratio of the image corresponding to the vehicle information item from which the abnormality is detected can be set larger than the ratio when displayed in the same size as in a normal case.

Therefore, it is possible to obtain an effect that the user can readily understand the content of the abnormality of the vehicle.

In Embodiment 4 of the present invention, the display control unit 5 moves the images around the image corresponding to the vehicle information item from which an abnormality is detected, in predetermined directions and further away from the image corresponding to the vehicle information item from which the abnormality is detected, and then magnifies the image corresponding to the vehicle information item from which the abnormality is detected. Note, however, that the order of processing is not limited to this.

Embodiment 5

Figure 13:
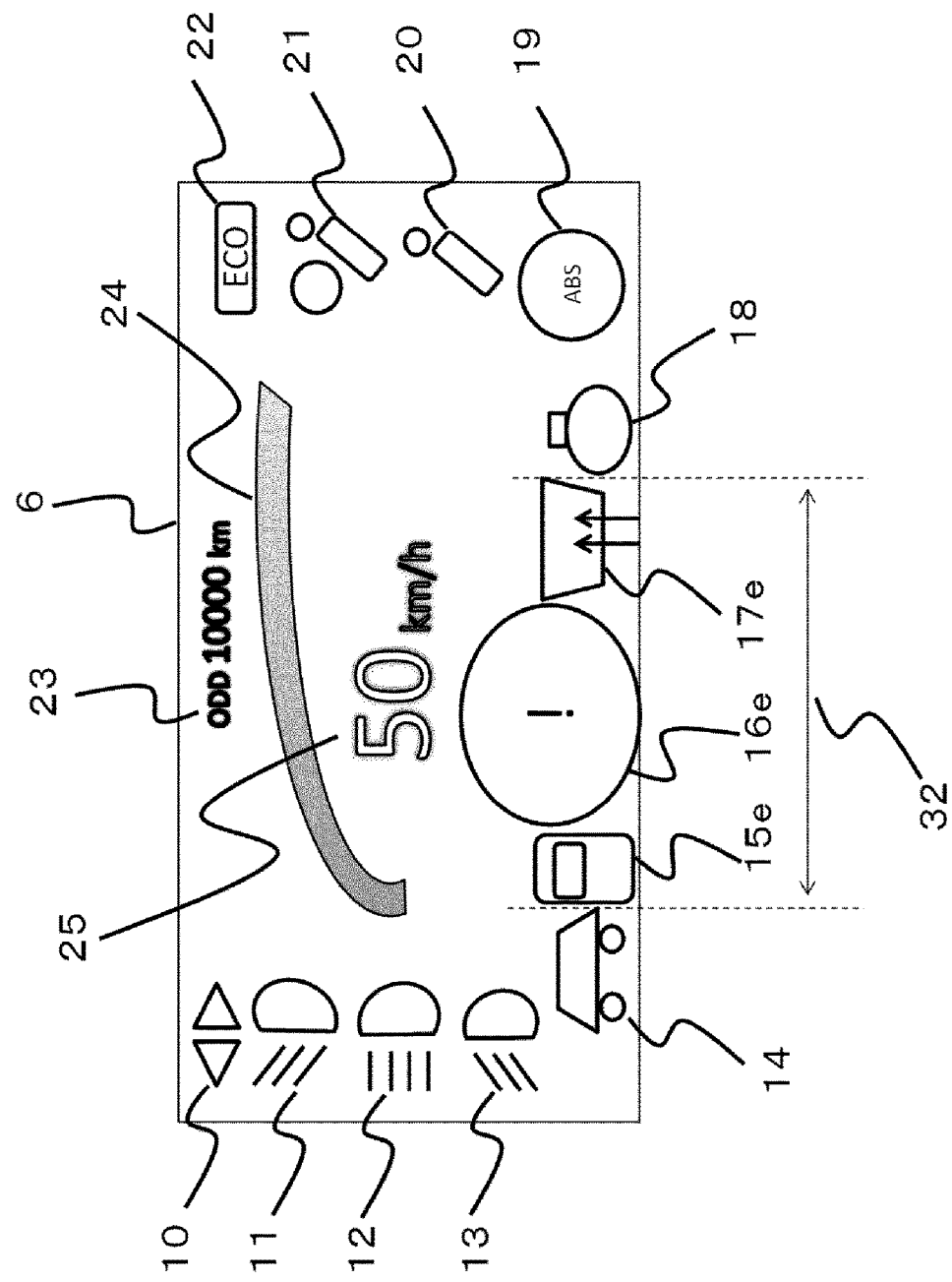
FIG. 13 is a screen image of a display unit of an information display device according to Embodiment 5 of the present invention in an abnormal state.
Figure 14:
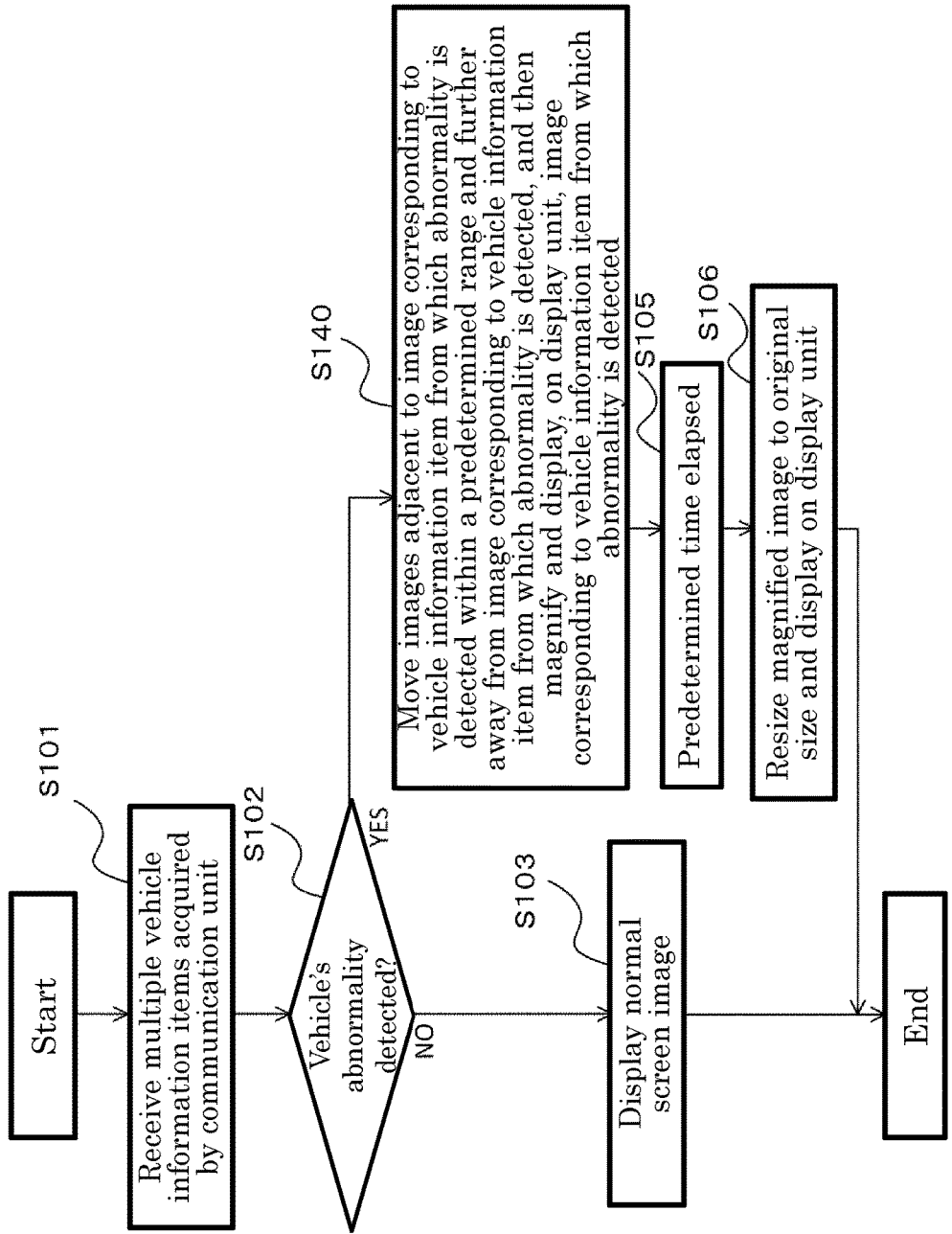
FIG. 14 is a flowchart illustrating the operation of a detection unit and a display control unit according to Embodiment 5 of the present invention.

With reference to FIG. 13 and FIG. 14, a display control device 1 and an information display device 2 according to Embodiment 5 of the present invention will be explained. In Embodiment 5 of the present invention, a modified example will be explained in which the images adjacent to the magnified image are moved within a predetermined range and further away from the magnified image. Explanation will be made below mainly on the points different from Embodiment 1, and the explanation about the same or corresponding portions will be omitted.

FIG. 13 is a screen image of the display unit 6 of the information display device 2 according to Embodiment 5 of the present invention. A display control unit 5 according to Embodiment 5 of the present invention moves and displays, on the display unit 6, the images adjacent to the image corresponding to the vehicle information item from which an abnormality is detected, within a predetermined range and further away from the image corresponding to the vehicle information item from which the abnormality is detected. As shown in FIG. 13, the image of a handbrake warning image 16e displayed on the display unit 6 is magnified, and a gasoline warning image 15e and a windshield condensation prevention image 17e which are adjacent to the handbrake warning image 16e are moved within a move range 32 where the adjacent images can be moved, and further away from the magnified handbrake warning image 16e.

The display control unit 5 moves the gasoline warning image 15 within the move range 32 in a direction (here, to the left on the screen image of the display unit 6) and further away from the magnified handbrake warning image 16e. Similarly, the display control unit 5 moves the windshield condensation prevention image 17e within the move range 32 in a direction (here, to the right on the screen of the display unit 6) and further away from the magnified handbrake warning image 16e. The display control unit 5 may determine the move range 32 in advance on the basis of positional relations between the images. In Embodiment 5 of the present invention, the display control unit 5 moves the gasoline warning image 15e and the windshield condensation prevention image 17e to the left and to the right, respectively. Note, however, that the move directions are not limited to the same, and the images may be moved in whichever direction as long as it is within the move range 32 of the display area on the screen. It is preferable, however, that the image is moved within a range that does not cause overlaps with other images. In FIG. 13, the display control unit 5 moves upward on the screen the gasoline warning image 15e and the windshield condensation prevention image 17e so that they will not overlap the speed display image 25. The moving of the images, however, is not limited to the method described above.

FIG. 14 is a flowchart illustrating the operation of the detection unit 4 and the display control unit 5 according to Embodiment 5 of the present invention. Steps S101, S102 and S103 are respectively the same as Steps S101, S102 and S103 illustrated in FIG. 4 of Embodiment 1. In Embodiment 5, when the detection unit 4 detects an abnormality of the vehicle in Step S102, the process proceeds to Step S140. In Step S140, the display control unit 5 moves the images adjacent to the image corresponding to the vehicle information item from which the abnormality is detected within a predetermined range and further away from the image corresponding to the vehicle information item from which the abnormality is detected, and then, magnifies and displays, on the display unit 6, the image corresponding to the vehicle information item from which the abnormality is detected. Steps S105 and S106 are respectively the same as Steps S105 and S106 illustrated in FIG. 4 of Embodiment 1.

As described above, according to the display control device 1 and the information display device 2 of Embodiment 5 of the present invention, the display control unit 5 is characterized in that the unit moves and displays, on the display unit 6, the images adjacent to the image corresponding to the vehicle information item from which an abnormality is detected, within a predetermined range and further away from the image corresponding to the vehicle information item from which the abnormality is detected.

According to this configuration, when the image corresponding to the vehicle information item from which an abnormality is detected is to be magnified, the adjacent images are moved within a predetermined range and further away from the image corresponding to the vehicle information item from which the abnormality is detected; therefore, the image corresponding to the vehicle information item from which the abnormality is detected can be magnified more than in a normal case. As the result, it is possible to obtain an effect that the user can readily understand the content of the abnormality of the vehicle.

In Embodiment 5 of the present invention, the display control unit 5 moves the images adjacent to the image corresponding to the vehicle information item from which an abnormality is detected, within a predetermined range and further away from the image corresponding to the vehicle information item from which the abnormality is detected, and then, magnifies the image corresponding to the vehicle information item from which the abnormality is detected. Note, however, that the order of processing is not limited to this.

Embodiment 6

Figure 15:
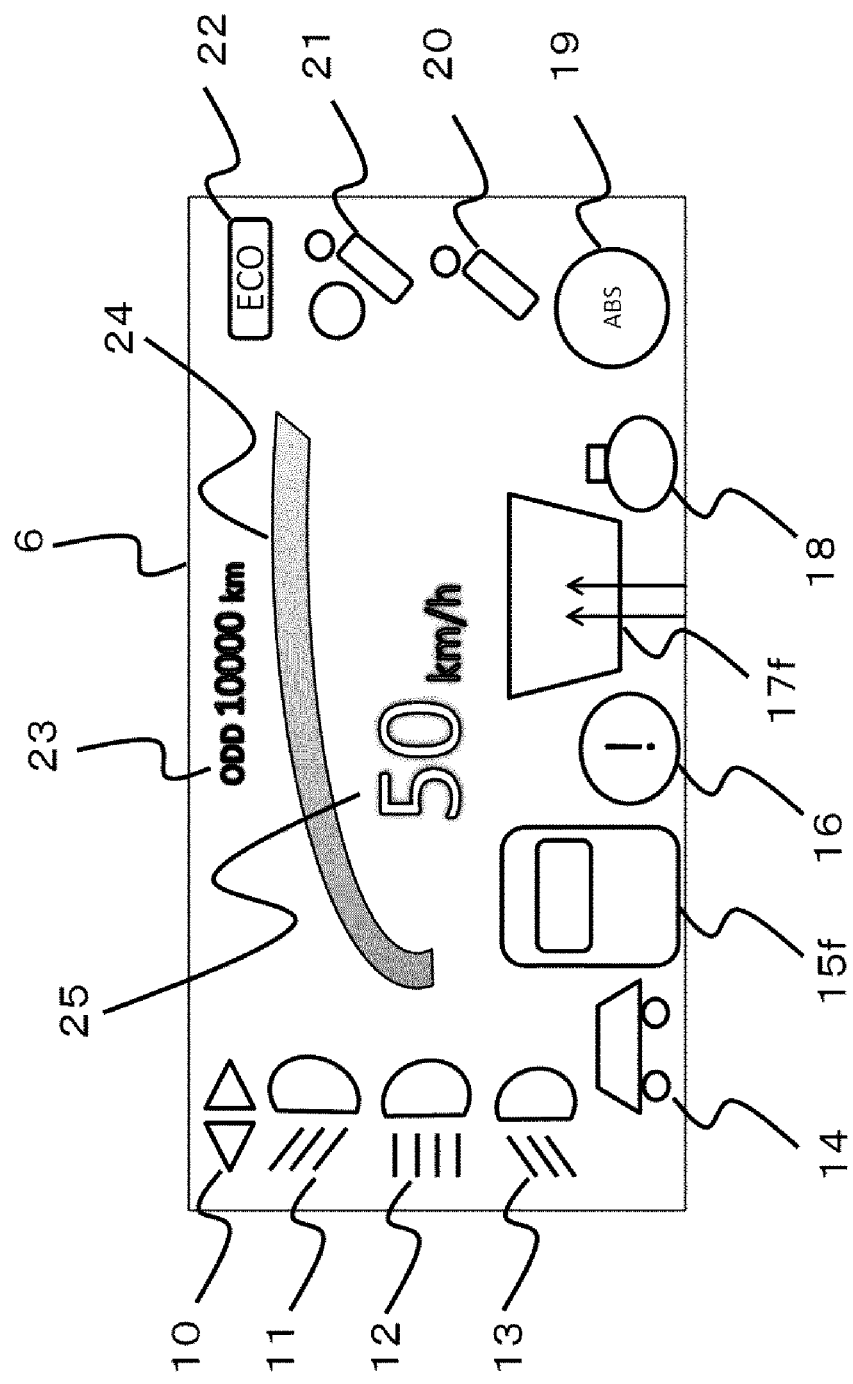
FIG. 15 is a screen image of a display unit of an information display device according to Embodiment 6 of the present invention in an abnormal state.

With reference to FIG. 15, a display control device 1 and an information display device 2 according to Embodiment 6 of the present invention will be explained. In the description of the display control device 1 and the information display device 2 of Embodiment 1, an example has been explained in which there is a single image to be magnified. In Embodiment 6 of the present invention, a modified example will be explained in which there are multiple images to be magnified. Explanation will be made below mainly on the points different from Embodiment 1, and the explanation about the same or corresponding portions will be omitted.

FIG. 15 is a screen image of a display unit 6 of the information display device 2 according to Embodiment 6 of the present invention in an abnormal state. In a case where there are multiple vehicle information items from which abnormalities are detected, a display control unit 5 according to Embodiment 6 of the present invention magnifies and displays, on the display unit 6, the images each corresponding to one of the multiple vehicle information items from which the abnormalities are detected. In FIG. 15, an example is shown where two vehicle information items indicating abnormalities are detected, and accordingly a gasoline warning image 15f and a windshield condensation prevention image 17f are magnified and displayed on the display unit 6.

According to this configuration, when there are multiple vehicle information items from which abnormalities are detected, the user can readily understand the contents of the vehicle's abnormalities each corresponding to one of the images because the images each corresponding to one of the vehicle information items from which the abnormalities are detected are magnified and displayed on the display unit 6.

In Embodiment 6 of the present invention, when two vehicle information items indicating abnormalities are detected, the display control unit 5 magnifies and displays, on display unit 6 at the same time, the images corresponding to the vehicle information items from which the abnormalities are detected. Note, however, that the timing of displaying the images is not limited to this. For example, the images each corresponding to one of the vehicle information items from which the abnormalities are detected may be displayed on display unit 6 with a certain time lag. Similarly, when three or more vehicle information items indicating abnormalities are detected, the display control unit 5 may magnify and display the images each corresponding to one of the vehicle information items from which the abnormalities are detected on the display unit 6 either at the same time, or with certain time lags. Further, in accordance with the significance levels of the vehicle information items from which abnormalities are detected, the display control unit 5 may determine the order of magnifying and displaying the images on the display unit 6, as well as the magnification ratios.

Embodiment 7

With reference to FIGS. 16 through 19, a display control device 1 and an information display device 2 according to Embodiment 7 of the present invention will be explained. In the explanation of the display control device 1 and the information display device 2 according to Embodiment 1, it has been explained that the image corresponding to the vehicle information item from which an abnormality is detected is magnified and displayed on the display unit 6, and then, is resized to its original size to be displayed on the display unit 6 again. In Embodiment 7 of the present invention, a modified example will be explained in which another abnormality is newly detected, after the image corresponding to the vehicle information item from which an abnormality is detected is magnified and displayed on the display unit 6. Explanation will be made below mainly on the points different from Embodiment 1, and the explanation about the same or corresponding portions will be omitted.

Figure 16:
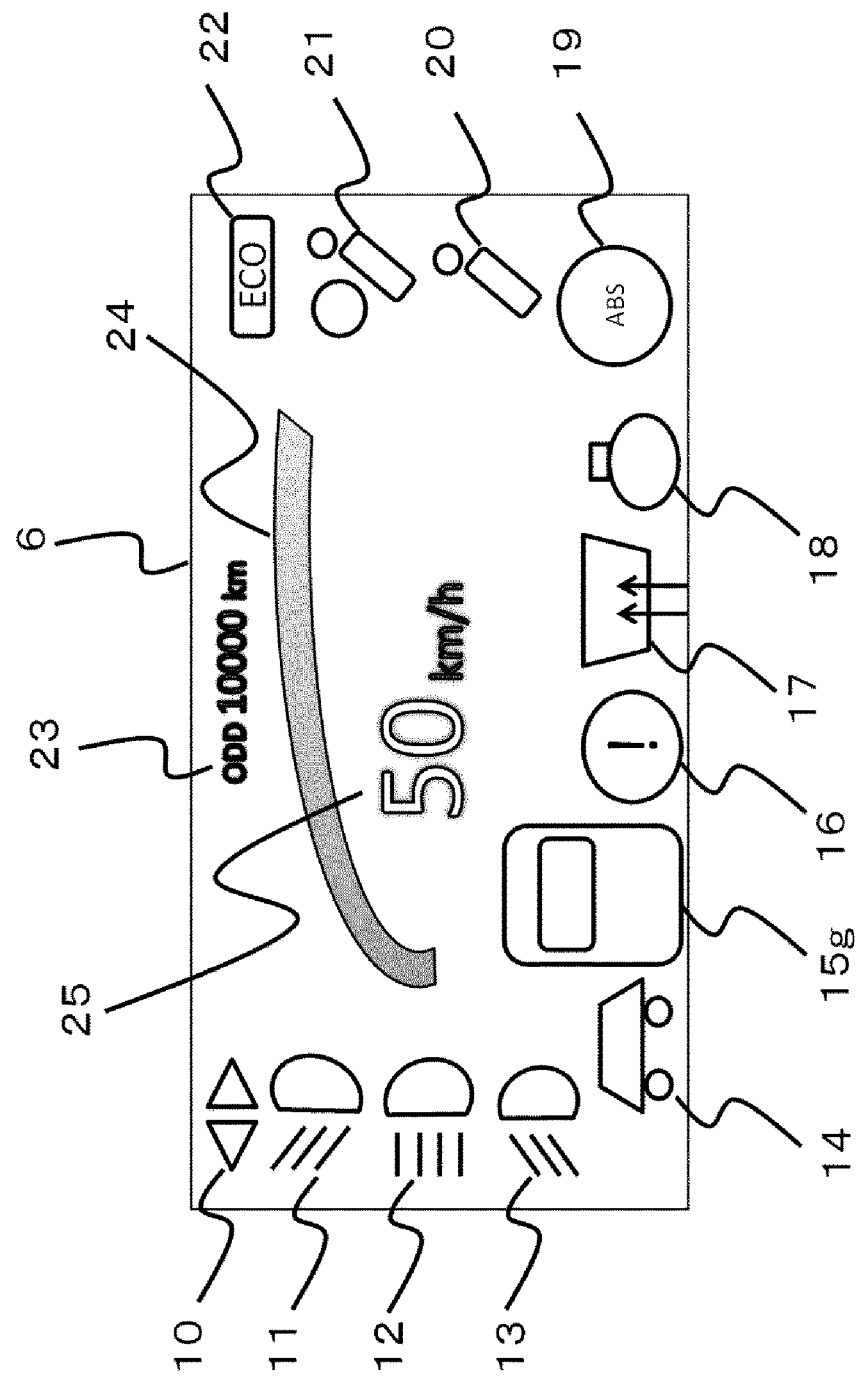
FIG. 16 is a screen image of a display unit of an information display device according to Embodiment 7 of the present invention in an abnormal state.
Figure 17:
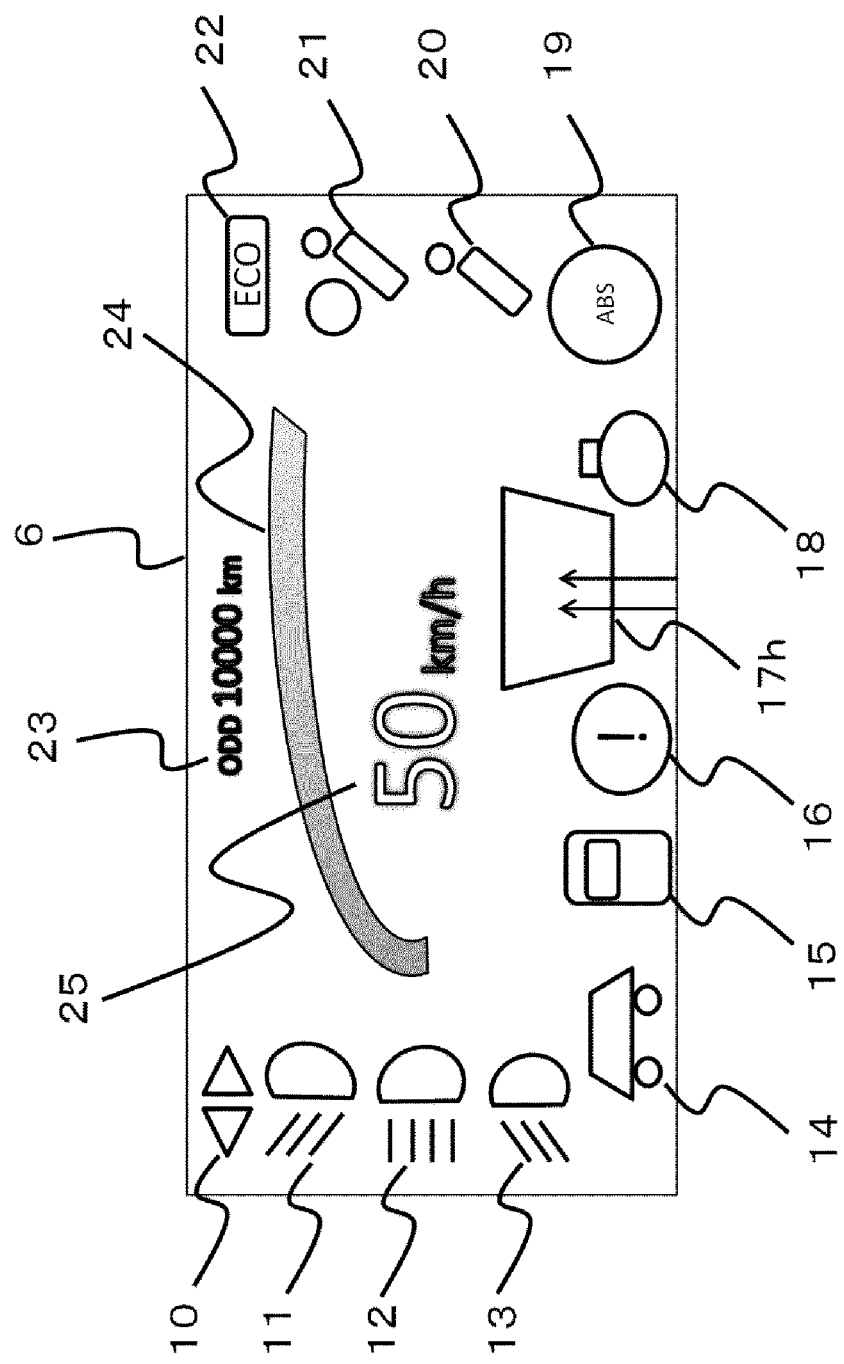
FIG. 17 is a screen image of the display unit of the information display device according to Embodiment 7 of the present invention in an abnormal state.

FIG. 16 and FIG. 17 are screen images of the display unit 6 of the information display device 2 according to Embodiment 7 of the present invention in an abnormal state. A display control unit 5 according to Embodiment 7 of the present invention first magnifies and displays, on the display unit 6, the image corresponding to the vehicle information item from which an abnormality is detected, and then resizes the image to its original size (size in a normal state) to display it on the display unit 6. As shown in FIG. 16, the display control unit 5 displays, on the display unit 6, the image corresponding to the vehicle information item from which the abnormality is detected, here the magnified gasoline warning image 15g. In a state in which the magnified gasoline warning image 15g is displayed as shown in FIG. 16, when the detection unit 4 detects another new abnormality of the vehicle, the display control unit 5 resizes the magnified gasoline warning image 15g to its original size, and magnifies and displays, on the display unit 6, the image corresponding to the vehicle information item from which the new abnormality, here a windshield condensation prevention image 17h, is detected. In FIG. 17, the magnified windshield condensation prevention image 17h is shown.

Figure 18:
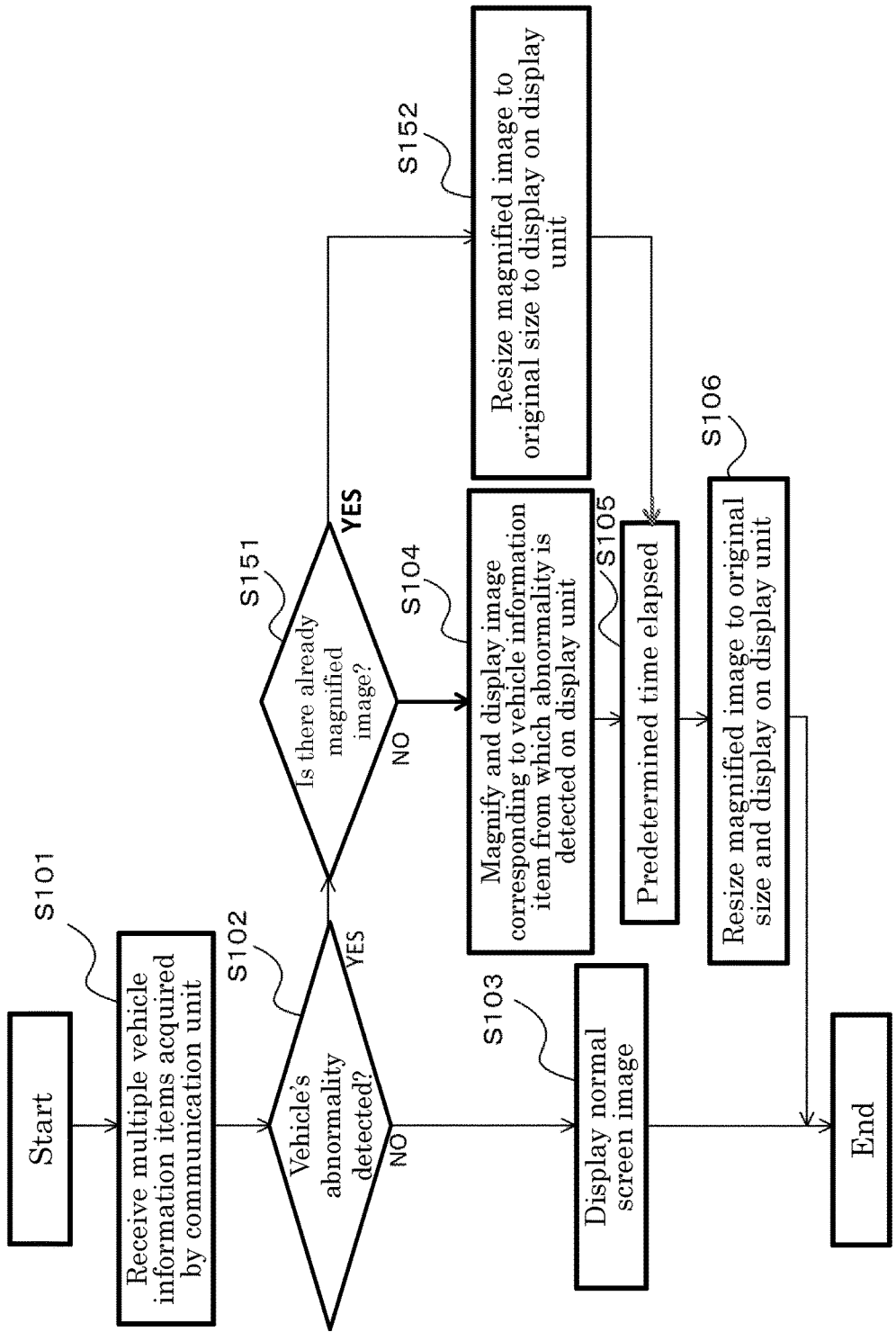
FIG. 18 is a flowchart illustrating the operation of a detection unit and a display control unit according to Embodiment 7 of the present invention.

FIG. 18 is a flowchart illustrating the operation of the detection unit 4 and the display control unit 5 according to Embodiment 7 of the present invention. Steps S101, S102 and S103 are respectively the same as Steps S101, S102 and S103 illustrated in FIG. 4 of Embodiment 1. In Embodiment 7, when the detection unit 4 detects an abnormality of the vehicle in Step S102, the process proceeds to Step S151. In Step S151, the display control unit 5 detects whether a magnified image is already displayed on the display unit 6. When a magnified image is already displayed on the display unit 6, the process proceeds to Step S152; and when a magnified image is not displayed on the display unit 6, the process proceeds to Step S104. In Step S152, the display control unit 5 resizes the magnified image already displayed on the display unit 6 to its original size and displays it on the display unit 6. Steps S105 and S106 are respectively the same as Steps S105 and S106 illustrated in FIG. 4 of Embodiment 1.

Figure 19:
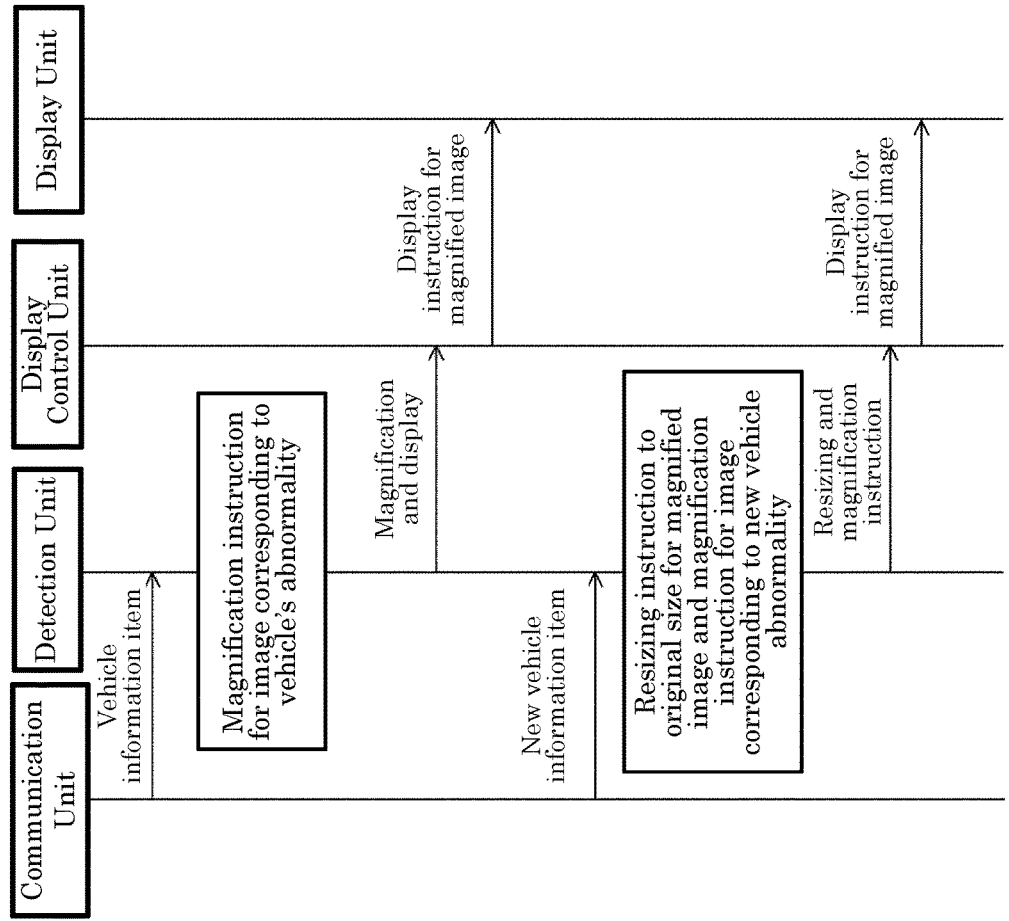
FIG. 19 is a sequence diagram of the information display device according to Embodiment 7 of the present invention.

FIG. 19 is a sequence diagram of the information display device 2 according to Embodiment 7 of the present invention. A communication unit 3 acquires multiple vehicle information items, and the detection unit 4 detects an abnormality of the vehicle from at least one of the multiple vehicle information items acquired by the communication unit 3. The display control unit 5 displays, on the display unit 6, the multiple images each corresponding to one of the multiple vehicle information items; and when an abnormality of the vehicle is detected by the detection unit 4, the display control unit magnifies and displays on display unit 6, from among the multiple images, the image corresponding to the vehicle information item from which the abnormality is detected. When, with the magnified image being displayed on the display unit 6, the communication unit 3 acquires another new vehicle information item and the detection unit 4 detects an abnormality in the new vehicle information item, the display control unit 5 resizes the magnified image already displayed on the display unit 6 to its original size, and displays it on the display unit 6. Then, the display control unit 5 magnifies and displays, on the display unit 6, the image corresponding to the vehicle information item from which the abnormality is newly detected.

As described above, according to the display control device 1 and the information display device 2 of Embodiment 7 of the present invention, the display control unit 5 is characterized in that, after magnifying and displaying, on the display unit 6, the image corresponding to the vehicle information item from which an abnormality is detected, the unit resizes the image to its original size and displays it on the display unit 6.

According to this configuration, when another abnormality is newly detected, because the image corresponding to the vehicle information item from which the abnormality is newly detected can be magnified and displayed on the display unit 6 in a timely manner, the vehicle's abnormality content can quickly be informed of to the user.

Note here that, when another abnormality is newly detected, the display control unit 5 may magnify and display, on the display unit 6, the image corresponding to the vehicle information item from which the abnormality is newly detected, without resizing, to an original size, the magnified image which has been already displayed on the display unit 6. In this case, because the multiple images each corresponding to one of the multiple vehicle information items from which abnormalities are currently detected are magnified and displayed all together on the display unit 6, the user can understand the contents of the abnormalities at a glance.

Embodiment 8

Figure 20:
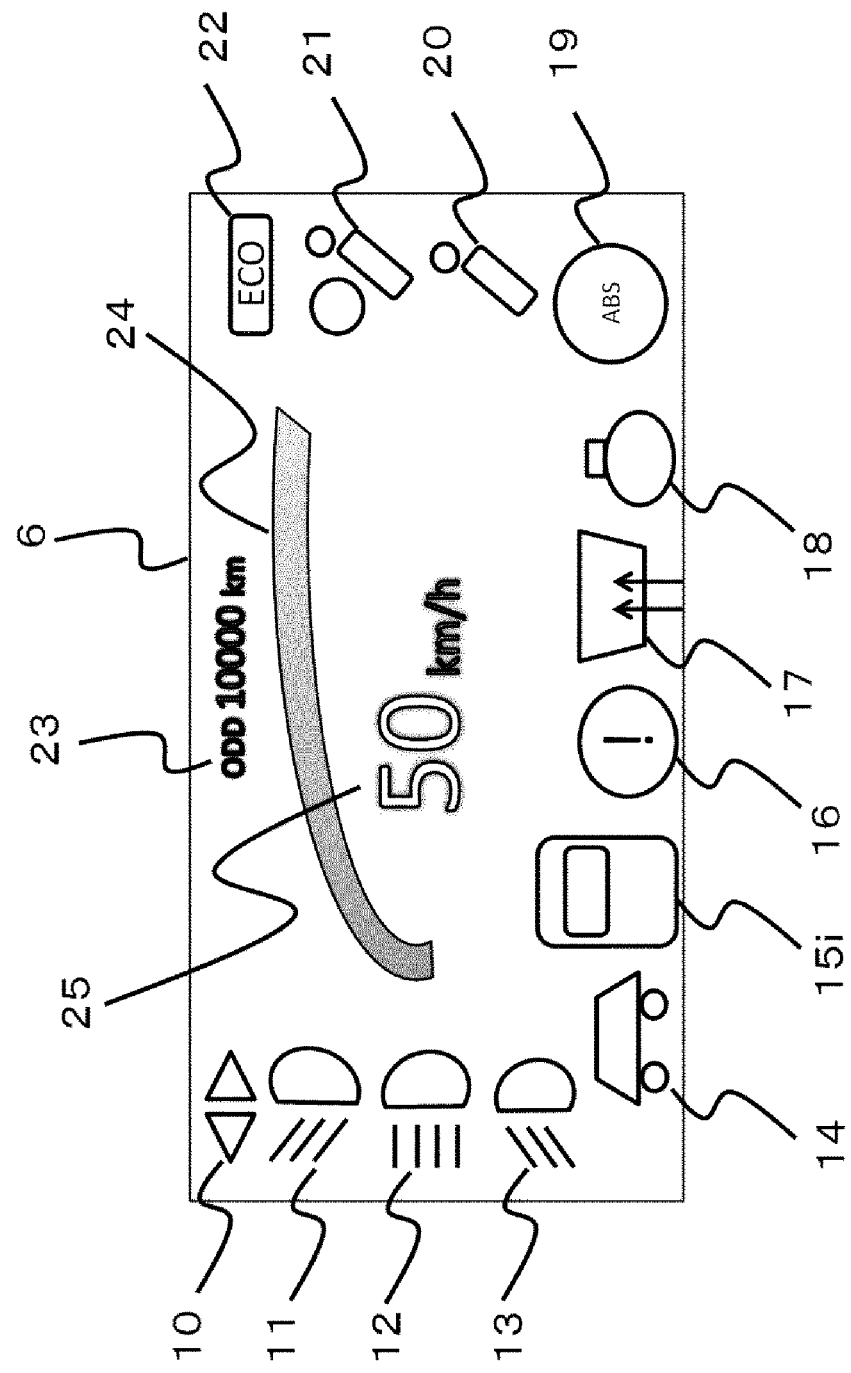
FIG. 20 is a screen image of a display unit of an information display device according to Embodiment 8 of the present invention in an abnormal state.
Figure 21:
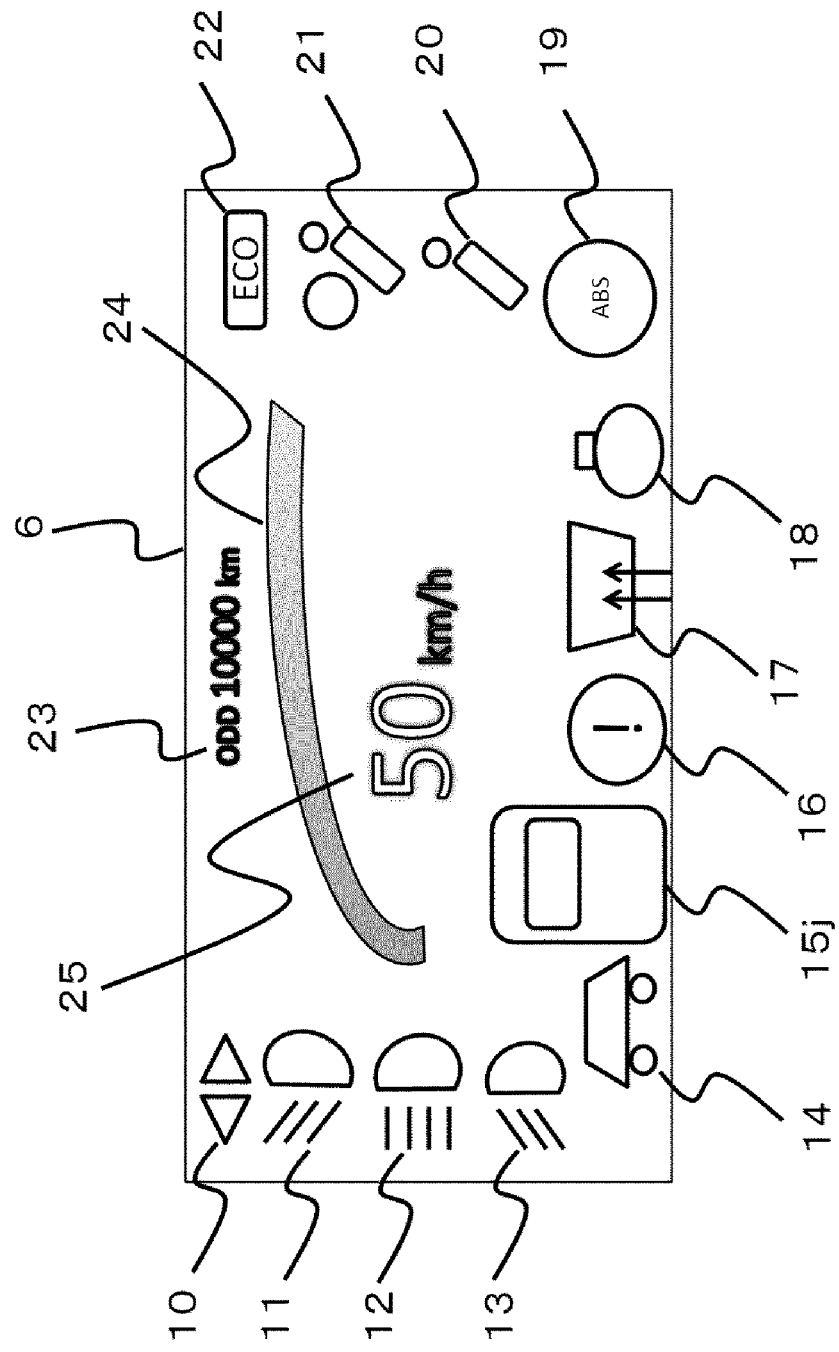
FIG. 21 is a screen image of the display unit of the information display device according to Embodiment 8 of the present invention in an abnormal state.
Figure 22:
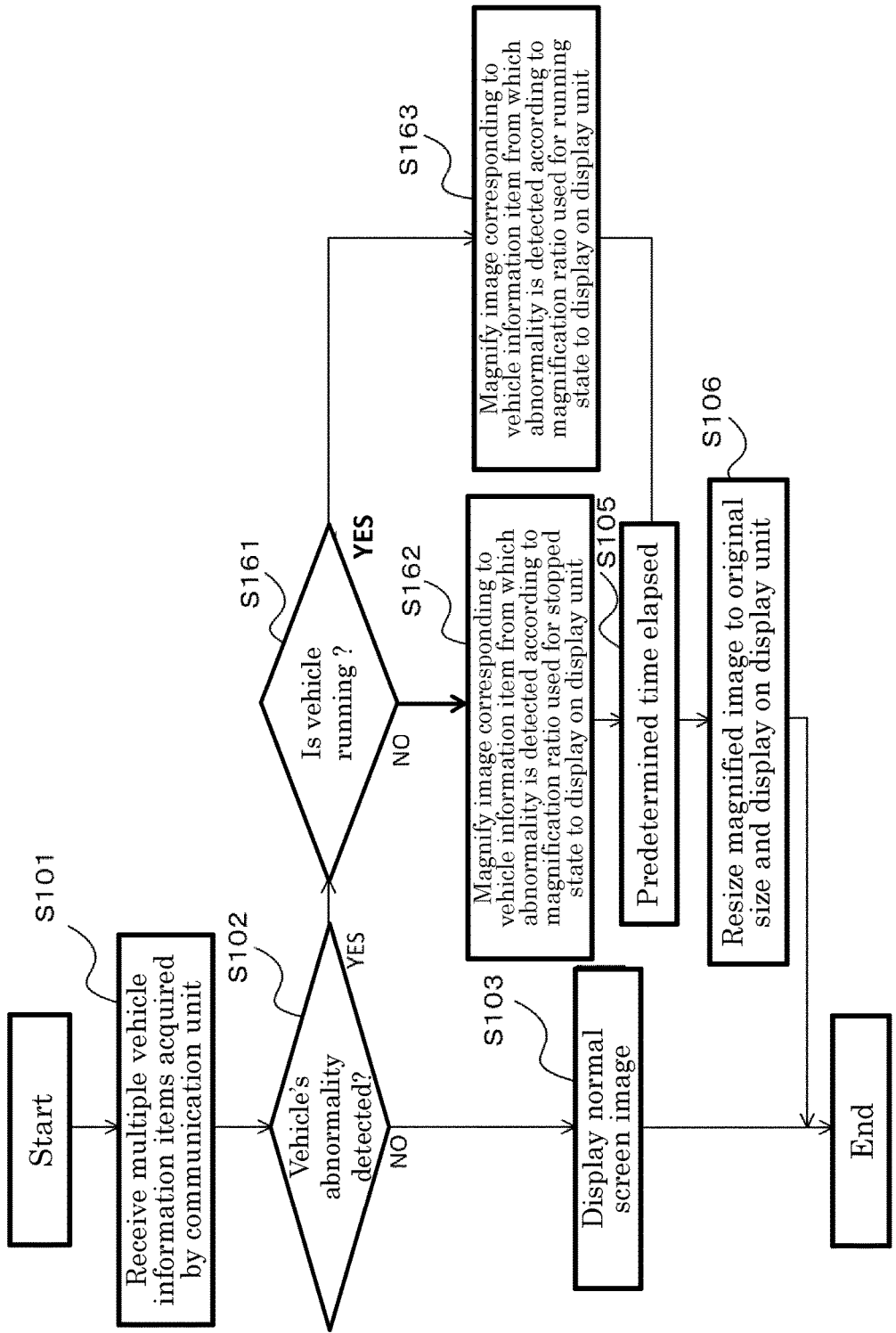
FIG. 22 is a flowchart illustrating the operation of a detection unit and a display control unit according to Embodiment 8 of the present invention.

With reference to FIGS. 20 through 22, a display control device 1 and an information display device 2 according to Embodiment 8 of the present invention will be explained. In Embodiment 8 of the present invention, a modified example will be explained in which the magnification ratio of the image corresponding to the vehicle information item from which an abnormality is detected varies according to whether the vehicle is running or not. Explanation will be made below mainly on the points different from Embodiment 1, and the explanation about the same or corresponding portions will be omitted.

FIG. 20 and FIG. 21 are screen images of a display unit 6 of the information display device 2 according to Embodiment 8 of the present invention in an abnormal state. Note here that FIG. 20 illustrates the screen image of the display unit 6 in a state in which the vehicle is running, and FIG. 21 illustrates the screen image thereof in a state in which the vehicle is stopped. According to Embodiment 8 of the present invention, when an abnormality of the vehicle is detected, a display control unit 5 magnifies and displays the image to be magnified while the vehicle is stopped, more than while the vehicle is running. It is understood that a magnified gasoline warning image 15j displayed while the vehicle is stopped as illustrated in FIG. 21 is larger than a magnified gasoline warning image 15i displayed while the vehicle is running as illustrated in FIG. 20.

FIG. 22 is a flowchart illustrating the operation of a detection unit 4 and the display control unit 5 according to Embodiment 8 of the present invention. Steps S101, S102 and S103 are respectively the same as Steps S101, S102 and S103 illustrated in FIG. 4 of Embodiment 1. In Embodiment 5, when the detection unit 4 detects an abnormality of the vehicle in Step S102, the process proceeds to Step S161. In Step S161, the detection unit 4 detects whether the vehicle is running or stopped. When the vehicle is stopped, the process proceeds to Step S162, and when the vehicle is running, the process proceeds to Step S163. In Step S162, the image corresponding to the vehicle information item from which the abnormality is detected is magnified according to the magnification ratio used for a stopped state, and is displayed on the display unit 6, and the process proceeds to Step S105. In Step S163, the image corresponding to the vehicle information item from which the abnormality is detected is magnified according to the magnification ratio used for a running state, and is displayed on display unit 6, and the process proceeds to Step S105. Steps S105 and S106 are respectively the same as Steps S105 and S106 illustrated in FIG. 4 of Embodiment 1.

As described above, according to the display control device 1 and the information display device 2 of Embodiment 8 of the present invention, the display control unit 5 is characterized in that, when an abnormality of the vehicle is detected, the image magnified and displayed in a stopped state is larger than the image magnified and displayed in a running state.

According to this configuration, because the display control unit 5 changes the magnification ratio in accordance with the vehicle's state, the image magnified and displayed on the display unit 6 in a stopped state can be made larger than the image magnified and displayed thereon in a running state. When the vehicle is stopped, the risk of accident is lower than when the vehicle is running because the vehicle is not moving. Therefore, the user's attention can be attracted more to the magnified image by setting the image's magnification ratio larger than that for a running state. On the other hand, the image's magnification ratio for a running state is to be set smaller than that for a stopped state. As the result, it will be possible to make the user, or the driver recognize the abnormality of the vehicle, preventing the driver's attention from being overly attracted to the magnified image in a running state so as not to cause distraction.

Note that in this invention, any combination of, modification to, or omission of the embodiments within the scope of the invention is possible.

DESCRIPTION OF SYMBOLS 1 display control device
2 information display device
3 communication unit
3a communication device
4 detection unit
5 display control unit
6 display unit
6a display
7 CPU
8 memory
10 indicator image
11 headlight range control image
12 high beam image
13 low beam image
14 air pressure warning image
15 gasoline warning image
16 handbrake warning image
17 windshield condensation prevention image
18 lamp warning image
19 ABS operation image
20 airbag inactive image
21 airbag warning image
22 ECO mode operation image
23 odometer image
24 engine revolution image
25 speed display image
30 a first lateral direction
31 a second lateral direction
32 move range

The invention claimed is:

1. A display control device to be mounted on a vehicle to control display of a display unit, the device comprising:
   a communication unit to acquire multiple vehicle information items;
   a detection unit to detect an abnormality of the vehicle from one of the multiple vehicle information items acquired by the communication unit; and
   a display control unit to display on the display unit, multiple images having a one to one correspondence with the multiple vehicle information items,
   wherein, when an abnormality of the vehicle which is stopped is detected by the detection unit, the display control unit magnifies, from among the displayed multiple images, the particular image corresponding to the one of the multiple vehicle information items from which the abnormality is detected, according to a magnification ratio of the particular image for a stopped state, to be displayed on the display unit to replace displaying of the particular image with displaying of the magnified image, wherein, when an abnormality of the vehicle which is running is detected by the detection unit, the display control unit magnifies, from among the displayed multiple images, the particular image corresponding to the one of the multiple vehicle information items from which the abnormality is detected, according to a magnification ratio of the particular image for a running state, to be displayed on the display unit to replace displaying of the particular image with displaying of the magnified image, wherein, the particular image's magnification ratio for a running state is smaller than the particular image's magnification ratio for a stopped state, the running state including running forward and running backward.

2. The display control device according to claim 1, wherein the display control unit displays, in a foreground, a portion of the magnified image overlapping an image corresponding to one of the multiple vehicle information items from which no abnormality is detected.

3. The display control device according to claim 1, wherein the display control unit shrinks and displays, on the display unit, an image that is adjacent to the particular image corresponding to the one of the multiple vehicle information items from which the abnormality is detected, and that corresponds to one of the multiple vehicle information items from which no abnormality is detected.

4. The display control device according to claim 1, wherein the display control unit moves and displays, on the display unit, an image around the particular image corresponding to the one of the multiple vehicle information items from which the abnormality is detected, in a predetermined direction and further away from the particular image corresponding to the one of the multiple vehicle information items from which the abnormality is detected.

5. The display control device according to claim 1, wherein the display control unit moves and displays, on the display unit, an image adjacent to the particular image corresponding to the one of the multiple vehicle information items from which the abnormality is detected, within a predetermined range and further away from the particular image corresponding to the one of the multiple vehicle information items from which the abnormality is detected.

6. The display control device according to claim 1, wherein the display control unit, after magnifying and displaying, on the display unit, the particular image corresponding to the one of the multiple vehicle information items from which the abnormality is detected, resizes the particular image to its original size to display on the display unit.

7. A display control device to be mounted on a vehicle to control display of a display unit, the device comprising:
a communication unit to acquire multiple vehicle information items;
a detection unit to detect an abnormality of the vehicle from one of the multiple vehicle information items acquired by the communication unit; and
a display control unit to display on the display unit, multiple images having a one to one correspondence with the multiple vehicle information items,
wherein, when an abnormality of the vehicle is detected by the detection unit, the display control unit magnifies, from among the displayed multiple images, the particular image corresponding to the one of the multiple vehicle information items from which the abnormality is detected, according to a predetermined magnification ratio associated with a significance level of the vehicle information item, to be displayed on the display unit to replace displaying of the particular image with displaying of the magnified image, and
wherein different ones of said multiple vehicle information items are associated with different significance levels which, in turn, are associated with different magnification ratios.

\* \* \* \* \*